United States Patent
Wang

(10) Patent No.: US 12,327,441 B2
(45) Date of Patent: Jun. 10, 2025

(54) VEHICLE DATA PROCESSING METHOD AND APPARATUS, COMPUTER DEVICE, AND STORAGE MEDIUM

(71) Applicant: Tencent Technology (Shenzhen) Company Limited, Shenzhen (CN)

(72) Inventor: Yuwen Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 310 days.

(21) Appl. No.: 17/969,628

(22) Filed: Oct. 19, 2022

(65) Prior Publication Data

US 2023/0045727 A1    Feb. 9, 2023

Related U.S. Application Data

(63) Continuation of application No. PCT/CN2021/121319, filed on Sep. 28, 2021.

(30) Foreign Application Priority Data

Dec. 3, 2020    (CN) .......................... 202011398107.8

(51) Int. Cl.
G07C 5/04    (2006.01)
(52) U.S. Cl.
CPC ...................... G07C 5/04 (2013.01)
(58) Field of Classification Search
None
See application file for complete search history.

(56) References Cited

U.S. PATENT DOCUMENTS

2010/0131142 A1    5/2010    Deng et al.
2014/0330505 A1*   11/2014    Wenneman ............ G01C 21/34
                                                   701/117
(Continued)

FOREIGN PATENT DOCUMENTS

CN    102692227 A    9/2012
CN    105741556 A    7/2016
(Continued)

OTHER PUBLICATIONS

Tencent Technology, Indian Office Action, IN Patent Application No. 202347013175, Jan. 4, 2024, 10 pgs.

(Continued)

*Primary Examiner* — James J Lee
*Assistant Examiner* — Andrew Sang Kim
(74) *Attorney, Agent, or Firm* — Morgan, Lewis & Bockius LLP

(57) ABSTRACT

This application involves a vehicle data processing method performed by a computer device. The method includes: obtaining current vehicle trajectory data and current vehicle status data of a target vehicle; determining a current travel scenario and a corrected vehicle speed of the target vehicle according to the current vehicle trajectory data and a historical vehicle trajectory data set of the target vehicle; determining a target matching mode of the current vehicle trajectory data and the current vehicle status data based on the corrected vehicle speed and vehicle speed reference information corresponding to the current travel scenario; obtaining target matching vehicle trajectory data corresponding to the current vehicle status data from the current vehicle trajectory data according to the target matching mode; and transmitting recommended information to the target vehicle based on the target matching vehicle trajectory (Continued)

data, the current vehicle status data, and the current travel scenario.

20 Claims, 12 Drawing Sheets

(56) References Cited

U.S. PATENT DOCUMENTS

| | | | |
|---|---|---|---|
| 2016/0280220 A1* | 9/2016 | Parundekar | B60W 50/0098 |
| 2020/0302789 A1 | 9/2020 | Oyama | |
| 2021/0377355 A1* | 12/2021 | Ren | H04L 67/12 |

FOREIGN PATENT DOCUMENTS

| | | |
|---|---|---|
| CN | 105761483 A | 7/2016 |
| CN | 109094575 A | 12/2018 |
| CN | 109425355 A | 3/2019 |
| CN | 109739230 A | 5/2019 |
| CN | 110300175 A | 10/2019 |
| CN | 110579219 A | 12/2019 |
| CN | 110807915 A | 2/2020 |
| CN | 110986985 A | 4/2020 |
| CN | 111516622 A | 8/2020 |
| CN | 111598663 A | 8/2020 |
| CN | 111625709 A | 9/2020 |
| CN | 111859167 A | 10/2020 |
| CN | 111860879 A | 10/2020 |
| CN | 111949891 A | 11/2020 |
| CN | 112380448 A | 2/2021 |
| JP | 2010083312 A | 4/2010 |
| JP | 2017084113 A | 5/2017 |
| WO | WO-2019222651 A1 * | 11/2019 ............... E01F 9/00 |

OTHER PUBLICATIONS

Tencent Technology, WO, PCT/CN2021/121319, Dec. 31, 2021, 4 pgs.
Tencent Technology, Iprp, PCT/CN2021/121319, May 30, 2023, 5 pgs.
Fozia Mehboob et al., "Trajectory Based Vehicle Counting and Anomalous Event Visualization in Smart Cities", Cluster Computing, May 5, 2017, 8 pgs., Retrieved from the Internet: https://link.springer.com/article/10.1007/s10586-017-0885-5.
Tencent Technology, ISR, PCT/CN2021/121319, Dec. 31, 2021, 2 pgs.
Yang Xing et al., "Personalized Vehicle Trajectory Prediction Based on Joint Time-Series Modeling for Connected Vehicles", IEEE Transactions on Vehicular Technology, vol. 69, Issue 2, Dec. 16, 2019, 3 pgs., Retrieved from the Internet: https://ieeexplore.ieee.org/document/8933492.
Ericsson GMBH, "Intelligent Transport Systems (ITS); Framework for Public Mobile Networks in Cooperative ITS (C-ITS)", Draft ETSI TR 102 962, V1.1.5, European Telecommunications Standards Institute, Aug. 2019, 45 pages, Retrieved from the Internet on Oct. 7, 2020: docbox.etsi.org/ITS/ITSWG2/05-CONTRIBUTIONS/2020/ITSWG2(20)000009_Draft_TR_102_9_62_V1_1_6.docx.
Tencent Technology, Extended European Search Report & Supplementary European Search Report, EP Patent Application No. 21899696.5, Feb. 9, 2024, 88 pgs.

* cited by examiner

VEHICLE DATA PROCESSING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2021/121319, entitled "VEHICLE DATA PROCESSING METHOD AND APPARATUS, COMPUTER DEVICE AND STORAGE MEDIUM" filed on Sep. 28, 2021, which claims priority to Chinese Patent Application No. 202011398107.8, filed with the State Intellectual Property Office of the People's Republic of China on Dec. 3, 2020, and entitled "VEHICLE DATA PROCESSING METHOD AND APPARATUS, COMPUTER DEVICE, AND STORAGE MEDIUM", all of which are incorporated herein by reference in their entirety.

FIELD OF THE TECHNOLOGY

This application relates to the field of computer technologies, and in particular, to a vehicle data processing method and apparatus, a computer device, and a storage medium.

BACKGROUND OF THE DISCLOSURE

With the rapid development of computer technologies and the improvement of people's living standards, the household ownership of vehicles has increased rapidly, and the vehicle has gradually become one of the indispensable traffic tools in people's lives. Information may be recommended to the vehicle during traveling of the vehicle.

In the conventional technology, vehicle information recommendation is performed based on vehicle trajectory data. However, data may be single when information is recommended to the vehicle only based on the vehicle trajectory data, resulting in low accuracy of information recommendation.

SUMMARY

According to various embodiments of this application, a vehicle data processing method and apparatus, a computer device, and a storage medium are provided, which can improve accuracy of information recommendation.

A vehicle data processing method includes:
obtaining current vehicle trajectory data and current vehicle status data of a target vehicle;
obtaining a historical vehicle trajectory data set of the target vehicle, and determining a current travel scenario and a corrected vehicle speed of the target vehicle according to the current vehicle trajectory data and the historical vehicle trajectory data set;
obtaining vehicle speed reference information corresponding to the current travel scenario, and determining a target matching mode of the current vehicle trajectory data and the current vehicle status data based on the corrected vehicle speed and the vehicle speed reference information;
obtaining target matching vehicle trajectory data corresponding to the current vehicle status data from the current vehicle trajectory data according to the target matching mode; and
transmitting recommended information to the target vehicle based on the target matching vehicle trajectory data, the current vehicle status data, and the current travel scenario.

A vehicle data processing apparatus includes:
a data obtaining module, configured to obtain current vehicle trajectory data and current vehicle status data of a target vehicle;
a travel scenario determination module, configured to obtain a historical vehicle trajectory data set of the target vehicle, and determine a current travel scenario and a corrected vehicle speed of the target vehicle according to the current vehicle trajectory data and the historical vehicle trajectory data set;
a matching mode determination module, configured to obtain vehicle speed reference information corresponding to the current travel scenario, and determine a target matching mode of the current vehicle trajectory data and the current vehicle status data based on the corrected vehicle speed and the vehicle speed reference information;
a matching data determination module, configured to obtain target matching vehicle trajectory data corresponding to the current vehicle status data from the current vehicle trajectory data according to the target matching mode; and
an information recommendation module, configured to recommend information to the target vehicle based on the target matching vehicle trajectory data, the current vehicle status data, and the current travel scenario.

A vehicle data processing method, applicable to a vehicle, the method including:
acquiring current vehicle trajectory data and current vehicle status data;
transmitting the current vehicle trajectory data and the current vehicle status data to a server, so that the server obtains a historical vehicle trajectory data set, and determines a current travel scenario and a corrected vehicle speed of the vehicle according to the current vehicle trajectory data and the historical vehicle trajectory data set; obtains vehicle speed reference information corresponding to the current travel scenario, and determines a target matching mode of the current vehicle trajectory data and the current vehicle status data based on the corrected vehicle speed and the vehicle speed reference information; obtains target matching vehicle trajectory data corresponding to the current vehicle status data from the current vehicle trajectory data according to the target matching mode; and generates target recommended information based on the target matching vehicle trajectory data, the current vehicle status data, and the current travel scenario; and
receiving the target recommended information transmitted by the server, and displaying the target recommended information.

A vehicle data processing apparatus includes:
a data acquisition module, configured to acquire current vehicle trajectory data and current vehicle status data;
a data analysis module, configured to transmit the current vehicle trajectory data and the current vehicle status data to a server, so that the server obtains a historical vehicle trajectory data set, and determines a current travel scenario and a corrected vehicle speed of the vehicle according to the current vehicle trajectory data and the historical vehicle trajectory data set; obtains vehicle speed reference information corresponding to the current travel scenario, and determines a target matching mode of the current vehicle trajectory data and the current vehicle status data based on the corrected vehicle speed and the vehicle speed reference information; obtains target matching vehicle trajectory data corresponding to the current vehicle status data from the current vehicle trajectory data according to the target matching mode; and generates target recommended information based on the target matching vehicle trajectory data, the current vehicle status data, and the current travel scenario; and an information display module, configured to receive the target recommended information transmitted by the server, and display the target recommended information.

A computer device is provided, including a memory and one or more processors, the memory storing computer-readable instructions, the computer-readable instructions, when executed by the one or more processors, causing the one or more processors to perform the operations in the vehicle data processing method.

One or more non-volatile computer-readable storage media are provided, storing computer-readable instructions, the computer-readable instructions, when executed by one or more processors, causing the one or more processors to perform the operations in the vehicle data processing method.

A computer program product or computer program is provided, the computer program product or computer program including computer-readable instructions, the computer-readable instructions being stored in a computer-readable storage medium, and when a processor of a computer device reads the computer-readable instructions from the computer-readable storage medium, the processor executes the computer-readable instructions and causes the computer device to perform the operations in the vehicle data processing method.

Details of one or more embodiments of this application are provided in the subsequent accompanying drawings and descriptions. Other features, objectives, and advantages of this application become apparent from the specification, the drawings, and the claims.

BRIEF DESCRIPTION OF THE DRAWINGS

To describe the technical solutions in the embodiments of this application more clearly, the following briefly describes accompanying drawings required for describing the embodiments. Apparently, the accompanying drawings in the following description show merely some embodiments of this application, and a person skilled in the art may still derive other drawings according to these accompanying drawings without creative efforts.

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are only used for explaining this application, and are not used for limiting this application.

Figure 1:
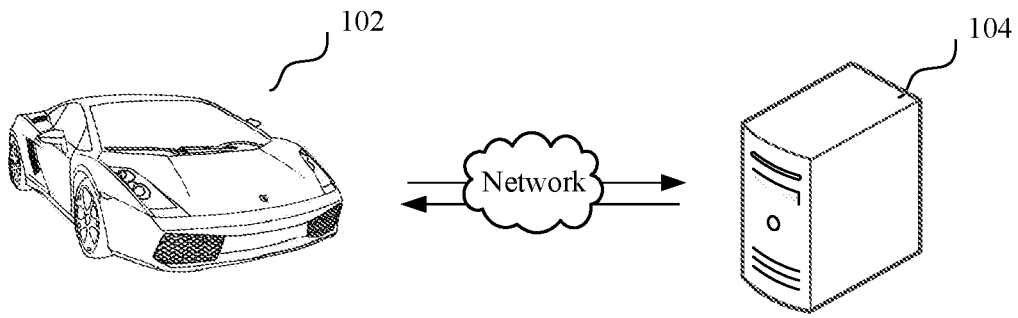
FIG. 1 is a diagram of an application environment of a vehicle data processing method according to an embodiment.

The vehicle data processing method provided in this application is applicable to an application environment shown in FIG. 1. A terminal 102 communicates with a server 104 through a network. The terminal 102 may transmit current vehicle trajectory data and current vehicle status data of a target vehicle to the server 104. After receiving the current vehicle trajectory data and the current vehicle status data, the server 104 may obtain a historical vehicle trajectory data set of the target vehicle, and determine a current travel scenario and a corrected vehicle speed of the target vehicle according to the current vehicle trajectory data and the historical vehicle trajectory data set. The server 104 may obtain vehicle speed reference information corresponding to the current travel scenario, determine a target matching mode of the current vehicle trajectory data and the current vehicle status data based on the corrected vehicle speed and the vehicle speed reference information, and obtain target matching vehicle trajectory data corresponding to the current vehicle status data from the current vehicle trajectory data according to the target matching mode. Finally, the server 104 transmits recommended information to the target vehicle based on the target matching vehicle trajectory data, the current vehicle status data, and the current travel scenario. For example, the server 104 may transmit the recommended information to the terminal 102 for display on the terminal 102.

The terminal 102 may be a target vehicle, or the terminal 102 may also be, but not limited to, a personal computer, a notebook computer, a smartphone, a tablet computer, an in-vehicle device, and a portable wearable device. The server 104 may be implemented by an independent server or a server cluster or a cloud server including a plurality of servers.

Figure 2:
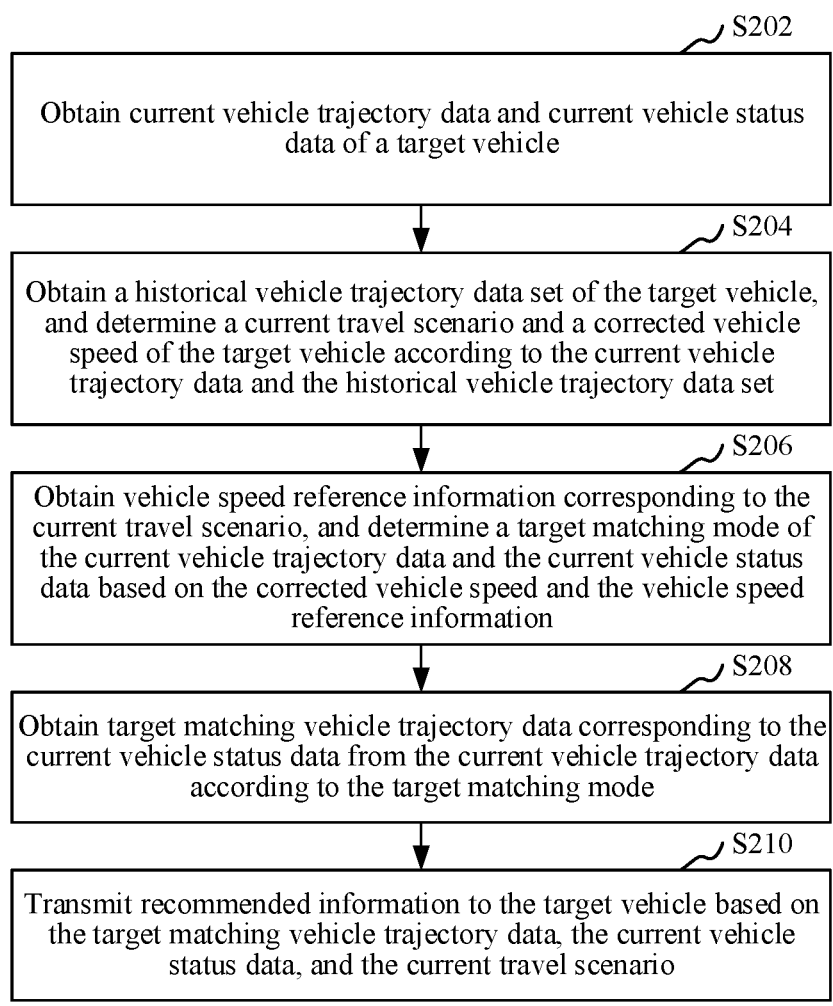
FIG. 2 is a schematic flowchart of a vehicle data processing method according to an embodiment.

In an embodiment, as shown in FIG. 2, a vehicle data processing method is provided. A description is provided by using an example in which the method is applicable to a server shown in FIG. 1, and the method includes the following steps:

Step S202: Obtain current vehicle trajectory data and current vehicle status data of a target vehicle.

The target vehicle is a vehicle on which information recommendation is performed. The target vehicle may be various types of vehicles such as a private car, a passenger car, a truck, a tractor, and the like. The current vehicle trajectory data is vehicle trajectory data of the target vehicle within a current time period. The current time period is a time period to which a current time point belongs, which includes, for example, five seconds, five minutes, five hours, and the like including the current time point. The vehicle trajectory data is data obtained by sampling a movement process of the target vehicle in a spatio-temporal environment. The vehicle trajectory data includes sampling data of at least one sampling point. The sampling data includes at least one of a sampling position, a sampling time, a travel speed, an azimuth angle, sampling precision, or the like, and sampling data of each sampling point constitutes the vehicle trajectory data according to a sampling sequence. The current vehicle status data is vehicle status data of the target vehicle within the current time period. The vehicle status data is data obtained by sampling a specific status of the target vehicle in the spatio-temporal environment. The vehicle status data includes at least one of a vehicle body status, a vehicle application status, or the like. The vehicle body status includes a status of vehicle parts, an environment inside the vehicle, and the like, for example, opening or closing of vehicle windows, opening or closing of vehicle doors, opening or closing of vehicle locks, normality or abnormality of tires, a percentage of vehicle fuel capacity, a percentage of vehicle power, a temperature inside the vehicle, and the like. The vehicle application status is opening or closing of an application of the vehicle, for example, opening a navigation application, opening a music application, and the like.

In an embodiment, the vehicle trajectory data is trajectory data generated in real time, and the vehicle status data is status data generated irregularly. It may be understood that the vehicle trajectory data is continuously generated once the vehicle starts, but the vehicle status data may be generated only when a status changes, for example, corresponding status data is generated when a vehicle window is detected to be opened, and corresponding status data is generated when fuel capacity is detected to be lower than 30%. To improve the efficiency of data transmission and reduce costs for data transmission, the vehicle trajectory data may be transmitted to the server through a persistent connection, and the vehicle status data may be transmitted to the server through a short connection. The persistent connection means that a plurality of data packets may be continuously transmitted through a communication connection, and the communication connection may not be closed after each communication is completed, so as to achieve multiplexing of the communication connection. Since the vehicle trajectory data is generated in real time, reporting the vehicle trajectory data of the vehicle through the persistent connection may shorten a time consumed for creating a communication connection each time, thereby improving the efficiency of data transmission. The short connection means that after the communication connection is established, the communication connection is immediately disconnected once data is transmitted or received. Since the vehicle status data is disconnected generated, reporting the vehicle status data of the vehicle through the short connection may avoid waste of communication connection, and the communication connection is established only when needed, which can reduce costs for data transmission.

In an embodiment, the persistent connection may be established based on a message queuing telemetry transport (MQTT) protocol, and the vehicle trajectory data is transmitted through the persistent connection. The short connection may be established based on a hypertext transfer protocol (HTTP), and the vehicle status data is transmitted through the short connection.

Specifically, the target vehicle may acquire current vehicle trajectory data and current vehicle status data by using a corresponding sensor, the current vehicle trajectory data and the current vehicle status data may also be directly transmitted to the server, or the current vehicle trajectory data and the current vehicle status data may be transmitted to the server by using another terminal. After receiving the current vehicle trajectory data and the current vehicle status data reported by the target vehicle, the server may associatively match the current vehicle trajectory data and the current vehicle status data, and accurately recommend information to the target vehicle based on the matched vehicle trajectory data and vehicle status data.

In an embodiment, the vehicle trajectory data may be reported to the server through an underlying SDK or an underlying application of the vehicle. The underlying application may be an in-vehicle application carried in the vehicle after a vehicle is delivered from a factory, which is an application developed by a vehicle manufacturer. Since the vehicle trajectory data is most basic data of the vehicle, underlying applications of the vehicle all carry a function of collecting the vehicle trajectory data. The underlying SDK or the underlying application may obtain the vehicle trajectory data acquired by the sensor of the vehicle in real time, to report the vehicle trajectory data to the server in real time or at a specified time. For example, vehicle trajectory data packets may be transmitted every five seconds, where each vehicle trajectory data packet includes five seconds of vehicle trajectory data, and one second corresponds to one piece of vehicle trajectory data. The vehicle status data may be reported to the server through an upper-layer application of the vehicle. The upper-layer application is an application newly installed on the vehicle after a vehicle is delivered, which is an application developed by various enterprises that provide different vehicle services. Since a vehicle status is not data necessary for the vehicle, the underlying application of the vehicle usually does not carry the function of collecting the vehicle status data. However, the upper-layer application of the vehicle may carry the function of collecting the vehicle status data to achieve corresponding vehicle services. The upper-layer application may obtain, when the vehicle status changes, the vehicle status data acquired by the sensor of the vehicle, and report the vehicle status data to the server.

Step S204: Obtain a historical vehicle trajectory data set of the target vehicle, and determine a current travel scenario and a corrected vehicle speed of the target vehicle according to the current vehicle trajectory data and the historical vehicle trajectory data set.

The historical vehicle trajectory data set includes a plurality of pieces of historical vehicle trajectory data of the target vehicle. The historical vehicle trajectory data is vehicle trajectory data of the target vehicle within a historical time period. The historical time period is a time period to which the historical time point belongs, for example, vehicle trajectory data of the target vehicle in the first half of the year. Each piece of historical vehicle trajectory data has a corresponding historical vehicle speed and target travel scenario. The historical vehicle speed is an average vehicle speed or an average vehicle speed interval of the target vehicle within the historical time period and in the target travel scenario. The travel scenario is a comprehensive description of travel information such as a travel environment, a travel time point, a travel route, a travel speed of the vehicle, for example, a travel scenario corresponding to going to work, going off work, shopping, and touring. The target travel scenario is obtained by analyzing a large quantity of historical vehicle travel trajectories. A target travel scenario may correspond to at least one piece of historical vehicle trajectory data, for example, a go-to-work scenario may correspond to two commonly used go-to-work travel routes. The current travel scenario is a current travel scenario corresponding to the target vehicle, which is obtained by analyzing the current vehicle trajectory data and the historical vehicle trajectory data set. The corrected vehicle speed is an average vehicle speed or an average vehicle speed interval of the target vehicle within a current time period and in the current travel scenario, which is obtained by correcting a current vehicle speed based on the historical vehicle speed. The corrected vehicle speed may be used for representing an average vehicle speed of the target vehicle from the current time period to a future time period.

Specifically, a driving behavior of a user has certain regularity. For example, a user A usually drives to work from 8:00 am to 9:00 am on weekdays with an average vehicle speed of 30 kilometers per hour, drives off work from 5:00 pm to 6:00 pm on weekdays with an average vehicle speed of 30 kilometers per hour, and drives out on Saturday afternoon with an average vehicle speed of 45 kilometers per hour. In this case, the server may perform cluster analysis on historical vehicle trajectory data of the target vehicle to obtain a historical vehicle trajectory data set, where the historical vehicle trajectory data in the historical vehicle trajectory data set may reflect a regular driving behavior of the user. The server may predict and determine a current travel scenario of the target vehicle based on the historical vehicle trajectory data set and the current vehicle trajectory data of the target vehicle, thereby further transmitting recommended information to the target vehicle based on the current travel scenario of the target vehicle more accurately and effectively, for example, a financial broadcast is recommended to the user when the user drives to work; and delicious food along the way is recommended to the user when the user drives out. In addition, although the current vehicle trajectory data of the target vehicle includes a travel speed, the travel speed usually indicates an instantaneous vehicle speed of the target vehicle. The instantaneous vehicle speed may rapidly increase or decrease when the target vehicle suddenly starts or brakes. In this case, recommended information may be inaccurate when information is recommended to the target vehicle directly based on the instantaneous vehicle speed of the target vehicle. Therefore, to avoid such a situation, the server may predict and determine a corrected vehicle speed of the target vehicle based on the historical vehicle trajectory data set and the current vehicle trajectory data of the target vehicle, thereby further transmitting recommended information to the target vehicle based on the corrected vehicle speed of the target vehicle more accurately and effectively.

In an embodiment, the server may obtain historical vehicle trajectory data of the target vehicle, perform cluster analysis on massive historical vehicle trajectory data to obtain a plurality of clusters, perform feature extraction on historical vehicle trajectory data in the same cluster to obtain travel feature information corresponding to each cluster, and obtain a target travel scenario corresponding to the each cluster based on the travel feature information corresponding to the each cluster. The server may perform cluster analysis on massive historical vehicle trajectory data based on at least one type of information of a travel time, a travel route, a travel starting point, or a travel end point. For example, historical vehicle trajectory data with the same travel starting point and travel end point are classified into the same cluster, historical vehicle trajectory data with coincidence of the travel route greater than a preset threshold are classified into the same cluster, and historical vehicle trajectory data with a time gap of the travel time less than a preset time threshold are classified into the same cluster. The server may extract at least one type of information such as a travel time, a travel route, a travel starting point, or a travel end point corresponding to each piece of historical vehicle trajectory data from the same cluster for summarizing and analyzing, and determine at least one type of information such as the analyzed travel time, travel route, travel starting point, or travel end point as the target travel scenario. For example, in the same cluster, historical vehicle trajectory data A corresponds to a travel time from 3:00 to 3:30, and historical vehicle trajectory data B corresponds to a travel time from 3:10 to 3:35. In this case, the travel time from 3:00 to 3:35 may be used as description information of the target travel scenario for describing the travel time. Further, each piece of description information of the target travel scenario may also be summarized and analyzed by an analyst, so that general information of the target travel scenario is obtained for overall description of a travel scenario. For example, based on the travel time, the travel route, the travel starting point, and the travel end point of the target travel scenario, the general information of the target travel scenario is determined to be going to work.

Step S206: Obtain vehicle speed reference information corresponding to the current travel scenario, and determine a target matching mode of the current vehicle trajectory data and the current vehicle status data based on the corrected vehicle speed and the vehicle speed reference information.

The vehicle speed reference information refers to reference information of a vehicle speed, and is used for assisting in determining a matching mode of vehicle trajectory data and vehicle status data. The vehicle speed reference information may be determined according to an actual situation, or may be obtained according to a self-defining formula. The vehicle speed reference information includes at least one vehicle speed threshold. Vehicle speed reference information corresponding to different travel scenarios may be the same or different. The matching mode is a matching mode of the vehicle trajectory data and the vehicle status data, and is used for mounting the vehicle status data on corresponding vehicle trajectory data, and binding and associating the vehicle status data and the corresponding vehicle trajectory data. The target matching mode is a matching mode in which the current vehicle trajectory data and the current vehicle status data are matched. For example, the current vehicle trajectory data includes a plurality of pieces of vehicle trajectory data, and the current vehicle status data includes one piece of vehicle status data. Therefore, it is necessary to obtain vehicle trajectory data matching the vehicle status data from the plurality of pieces of vehicle trajectory data for binding and associating the vehicle trajectory data and the vehicle status data.

Specifically, since the current vehicle trajectory data and the current vehicle status data are two different types of data, and the current vehicle trajectory data and the current vehicle status data are usually not reported by the same sender, it is necessary to better associate and match the current vehicle trajectory data and the current vehicle status data, to recommend information more accurately and effectively. Further, there are a plurality of matching modes for the vehicle trajectory data and the vehicle status data, and different matching modes are used in different travel conditions, so that accuracy of data matching may be improved, thereby improving accuracy and effectiveness of information recommendation. To determine the target matching mode, the server may obtain vehicle speed reference information corresponding to the current travel scenario, and determine a target matching mode of the current vehicle trajectory data and the current vehicle status data based on the corrected vehicle speed and the vehicle speed reference information.

In an embodiment, the matching mode time information matching and position information matching. The vehicle speed reference information includes one vehicle speed threshold. When the corrected vehicle speed is less than the vehicle speed threshold, it indicates that a travel speed of the target vehicle is relatively slow and position information of the target vehicle does not greatly change, and in this case, it may be determined that the target matching mode of the current vehicle trajectory data and the current vehicle status data is time information matching, and the current vehicle status data is mounted on corresponding vehicle trajectory data based on time information of data. When the corrected vehicle speed is greater than the vehicle speed threshold, it indicates that the travel speed of the target vehicle is relatively fast and the position information of the target vehicle greatly changes, and in this case, it may be determined that the target matching mode of the current vehicle trajectory data and the current vehicle status data is position information matching, and the current vehicle status data is mounted on corresponding vehicle trajectory data based on position information of data.

In an embodiment, a surrounding environment of the vehicle does not greatly change when the vehicle speed is appropriate. The vehicle trajectory data and the vehicle status data are matched, so that more effective and meaningful information recommendation may be performed on the vehicle based on the matched vehicle status data and the vehicle trajectory data. However, the surrounding environment of the vehicle greatly changes when the vehicle speed is too fast. In this case, the vehicle trajectory data and the vehicle status data are matched, but more effective and meaningful information recommendation cannot be performed on the vehicle based on the matched vehicle status data and the vehicle trajectory data, which is because recommended information obtained based on vehicle data of an old environment is no longer applicable to a current new environment. Therefore, to avoid such a situation, the vehicle speed reference information may include two vehicle speed thresholds, namely, a first vehicle speed threshold and a second vehicle speed threshold, the first vehicle speed threshold being less than the second vehicle speed threshold. It may be determined that the target matching mode of the current vehicle trajectory data and the current vehicle status data is time information matching when the corrected vehicle speed is less than the first vehicle speed threshold. It may be determined that the target matching mode of the current vehicle trajectory data and the current vehicle status data is position information matching when the corrected vehicle speed is greater than the first vehicle speed threshold and less than the second vehicle speed threshold. The vehicle trajectory data and the vehicle status data are not matched when the corrected vehicle speed is greater than the second vehicle speed threshold.

In an embodiment, the time information matching may be performed based on a generation time of the vehicle trajectory data and a generation time of the vehicle status data, or may be performed based on an arrival time of the vehicle trajectory data and an arrival time of the vehicle status data, or may be performed on the generation time of the vehicle trajectory data and the arrival time of the vehicle status data.

Step S208: Obtain target matching vehicle trajectory data corresponding to the current vehicle status data from the current vehicle trajectory data according to the target matching mode.

Step S210: Recommend information to the target vehicle based on the target matching vehicle trajectory data, the current vehicle status data, and the current travel scenario.

The target matching vehicle trajectory data is vehicle trajectory data matching the current vehicle status data. For example, the current vehicle trajectory data includes vehicle trajectory data 1 to 5, and the target matching vehicle trajectory data corresponding to the current vehicle status data may be vehicle trajectory data 3. Information recommendation may be to recommend various information such as weather, food, vehicle-related early warning information, and the like.

Specifically, after determining the target matching mode, the server may obtain the target matching vehicle trajectory data corresponding to the current vehicle status data from the current vehicle trajectory data according to the target matching mode, and accurately and effectively recommend information to the target vehicle based on the target matching vehicle trajectory data, the current vehicle status data, and the current travel scenario. For example, when a user drives to work, the target vehicle travels in a region A, and the user opens a vehicle window, the server may generate recommended information on the weather based on the matched vehicle status data and vehicle trajectory data, and the current travel scenario, and transmit the recommended information to the target vehicle. When the weather forecast for thunderstorm in the region A, the recommended information may be used for prompting the user to close the vehicle window and providing a current weather forecast. For example, when the user drives off work, the target vehicle travels in a region B, and the user opens a food application installed on the car, the server may generate recommended information on food based on the matched vehicle status data and vehicle trajectory data, and the current travel scenario, and transmit the recommended information to the target vehicle, the recommended information being used for recommending food in the region B to the user and providing a navigation route for reaching a location of food.

The vehicle data processing method includes: obtaining current vehicle trajectory data and current vehicle status data of a target vehicle; obtaining a historical vehicle trajectory data set of the target vehicle, and determining a current travel scenario and a corrected vehicle speed of the target vehicle according to the current vehicle trajectory data and the historical vehicle trajectory data set; obtaining vehicle speed reference information corresponding to the current travel scenario, and determining a target matching mode of the current vehicle trajectory data and the current vehicle status data based on the corrected vehicle speed and the vehicle speed reference information; obtaining target matching vehicle trajectory data corresponding to the current vehicle status data from the current vehicle trajectory data according to the target matching mode; transmitting recommended information to the target vehicle based on the target matching vehicle trajectory data, the current vehicle status data, and the current travel scenario. In this way, the current travel scenario of the vehicle is determined based on the current vehicle trajectory data and the historical vehicle trajectory data set of the target vehicle, and the current vehicle speed of the target vehicle may be corrected based on the current vehicle trajectory data and the historical vehicle trajectory data set of the target vehicle, to obtain a corrected vehicle speed that is more accurate and can better reflect an overall travel speed of the target vehicle in the current travel scenario. Further, the target matching mode of the current vehicle trajectory data and the current vehicle status data may be determined based on the current travel scenario and the corrected vehicle speed of the target vehicle, the current vehicle trajectory data and the current vehicle status data may be associated more accurately based on the target matching mode, and the target matching vehicle trajectory data matching the current vehicle status data may be determined more accurately, so that more accurate information recommendation may be performed on the target vehicle based on accurately matched current vehicle status data and target matching vehicle trajectory data, and the current travel scenario, thereby improving the accuracy and effectiveness of information recommendation.

In an embodiment, the obtaining current vehicle trajectory data and current vehicle status data of a target vehicle includes: selecting the current vehicle trajectory data from a candidate vehicle trajectory data set according to a data generation time when the current vehicle status data is received, the candidate vehicle trajectory data set being obtained in the following manners: receiving vehicle trajectory data periodically transmitted by the target vehicle, and adding the periodically transmitted vehicle trajectory data to the candidate vehicle trajectory data set, the periodically transmitted vehicle trajectory data carrying the data generation time.

The candidate vehicle trajectory data set is a cache container of the vehicle trajectory data, and is used for temporarily storing the vehicle trajectory data. The data generation time is a time at which a sensor acquires data.

Specifically, the target vehicle may regularly upload the vehicle trajectory data to the server, that is, periodically transmit the vehicle trajectory data to the server. For example, the target vehicle transmits vehicle trajectory data packets every five seconds, where each vehicle trajectory data packet includes five seconds of vehicle trajectory data, and one second corresponds to one piece of vehicle trajectory data. After receiving the vehicle trajectory data periodically transmitted by the target vehicle, the server may add the vehicle trajectory data to the candidate vehicle trajectory data set. When the current vehicle status data is received by the server, the server may obtain the current vehicle trajectory data from the candidate vehicle trajectory data set. The server may select vehicle trajectory data with a relatively new data generation time from the candidate vehicle trajectory data set according to the data generation time as the current vehicle trajectory data, for example, obtain a vehicle trajectory data packet with the latest data generation time is obtained from a target vehicle trajectory data set as the current vehicle trajectory data, or obtain three vehicle trajectory data packets with top three data generation time from the target vehicle trajectory data set as the current vehicle trajectory data. Then, the target matching vehicle trajectory data matching the current vehicle status data is determined from the current vehicle trajectory data, and information is accurately and effectively recommended to the target vehicle based on the target matching vehicle trajectory data, the current vehicle status data, and the current travel scenario.

In an embodiment, the candidate vehicle trajectory data set may be regularly updated, and useless or invalid vehicle trajectory data is deleted, thereby saving a storage space of the server. Updating the candidate vehicle trajectory data set may specifically be deleting older vehicle trajectory data, for example, deleting vehicle trajectory data whose data generation time is more than five minutes from a current time point in the candidate vehicle trajectory data set, and always maintain latest vehicle trajectory data within five minutes to be stored in the candidate vehicle trajectory data set. In this way, after receiving the current vehicle status data, the server may quickly select the current vehicle trajectory data from the candidate vehicle trajectory data set, thereby further quickly and effectively transmitting recommended information to the target vehicle based on the current vehicle trajectory data and the current vehicle status data. In addition, the server may also recommend information to the target vehicle based on the vehicle trajectory data when the vehicle status data is not received. Based on the above, the updating the candidate vehicle trajectory data set may also be deleting the vehicle trajectory data already used for information recommendation from the candidate vehicle trajectory data set. In this way, after the server receives the current vehicle status data, the current vehicle trajectory data selected from the candidate vehicle trajectory data set may also be vehicle trajectory data that has not been used for information recommendation, so that information may be effective and brand-new information recommendation may be subsequently performed on the target vehicle based on the current vehicle trajectory data and the current vehicle status data. Certainly, data cleansing performed on the candidate vehicle trajectory data set may be to delete both older vehicle trajectory data and the vehicle trajectory data already used for information recommendation.

In an embodiment, the method further includes: obtaining target data from the candidate vehicle trajectory data set in chronological order of the data generation time, and transmitting recommended information to the target vehicle based on the target data; and deleting the target data from the candidate vehicle trajectory data set, to obtain an updated candidate vehicle trajectory data set.

Specifically, in addition to transmitting recommended information to the vehicle when the vehicle status changes, information recommendation may also be performed on the vehicle directly based on the vehicle trajectory data, for example, providing a navigation route, traffic condition information, and the like. The server may recommend information to the vehicle based on the vehicle trajectory data when the vehicle status data is not received. Certainly, the server may also recommend information to the vehicle based on the vehicle trajectory data when the vehicle status data and the vehicle trajectory data cannot be matched. After receiving the vehicle trajectory data periodically transmitted by the target vehicle, the server may add the vehicle trajectory data to the candidate vehicle trajectory data set. During recommending information, the server may obtain the target data from the candidate vehicle trajectory data set in chronological order of the data generation time, for example, first obtain vehicle trajectory data with an older data generation time as target data to recommend information to the target vehicle based on the target data, and then obtain vehicle trajectory data with a relatively new data generation time as target data to recommend information to the target vehicle based on the target data. After the target data is used for information recommendation, the candidate vehicle trajectory data set may be updated, so that the target data is deleted from the candidate vehicle trajectory data set to obtain an updated candidate vehicle trajectory data set, thereby ensuring that relatively new vehicle trajectory data on which information recommendation has not been performed is always stored in the candidate vehicle trajectory data set, and ensuring timeliness of information recommendation.

In an embodiment, when a data volume of the candidate vehicle trajectory data set reaches a preset threshold, that is, the data volume is sufficient, the server obtains target data from the candidate vehicle trajectory data set in chronological order of the data generation time, to further perform relatively continuous and stable information recommendation on the target vehicle based on the target data.

In an embodiment, the transmitting recommended information to the target vehicle based on the target data may specifically include: obtaining a historical vehicle trajectory data set of the target vehicle, determining a current travel scenario of the target vehicle based on the target data and the historical vehicle trajectory data set, and transmitting recommended information to the target vehicle based on the target data and the current travel scenario.

In this embodiment, simple information recommendation may also be performed on the target vehicle based on the vehicle trajectory data before the vehicle status data is received. In addition, the vehicle trajectory data is cached through the candidate vehicle trajectory data set, and the vehicle trajectory data already used for information recommendation is deleted from the candidate vehicle trajectory data set in time, so that it may be ensured that relatively new vehicle trajectory data on which information recommendation has not been performed is always stored in the candidate vehicle trajectory data set, thereby avoiding repeated, ineffective, and meaningless information recommendation performed on the target vehicle, and ensuring timeliness of information recommendation.

Figure 3:
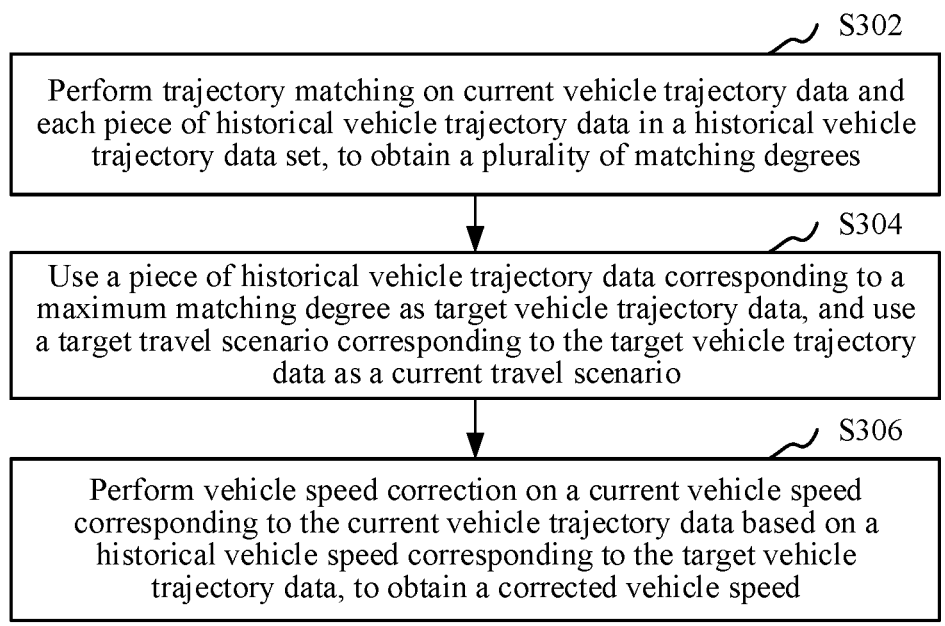
FIG. 3 is a schematic flowchart of determining a current travel scenario and a corrected vehicle speed of a target vehicle according to an embodiment.

In an embodiment, as shown in FIG. 3, the determining a current travel scenario and a corrected vehicle speed of the target vehicle according to the current vehicle trajectory data and the historical vehicle trajectory data set includes:

Step S302: Perform trajectory matching between the current vehicle trajectory data and each piece of historical vehicle trajectory data in the historical vehicle trajectory data set, to obtain a plurality of matching degrees.

Step S304: Use historical vehicle trajectory data corresponding to a maximum matching degree as target vehicle trajectory data, and use a target travel scenario corresponding to the target vehicle trajectory data as the current travel scenario.

Step S306: Perform vehicle speed correction on a current vehicle speed corresponding to the current vehicle trajectory data based on a historical vehicle speed corresponding to the target vehicle trajectory data, to obtain the corrected vehicle speed.

Specifically, when determining the current travel scenario of the target vehicle according to the current vehicle trajectory data and the historical vehicle trajectory data set, the server may perform trajectory matching between the current vehicle trajectory data and each piece of historical vehicle trajectory data in the historical vehicle trajectory data set, and calculate a matching degree between the current vehicle trajectory data and the each piece of historical vehicle trajectory data according to an overlapping area of trajectories. A larger overlapping area indicates a higher matching degree. The server may determine a maximum matching degree from matching degrees, and use a target travel scenario corresponding to historical vehicle trajectory data corresponding to the maximum matching degree as the current travel scenario, that is, use historical vehicle trajectory data corresponding to the maximum matching degree as target vehicle trajectory data, and use a target travel scenario corresponding to the target vehicle trajectory data as the current travel scenario. It may be understood that, a higher matching degree between the current vehicle trajectory data and the historical vehicle trajectory data indicates that the user is likely to travel on a route frequently traveled in daily life, and driving environments are similar, and therefore, a current driving behavior and a historical driving behavior of the user may be relatively similar, for example, the same driving destination, a close travel speed, and the like. Therefore, the current travel scenario may be considered as the target travel scenario corresponding to the historical vehicle trajectory data corresponding to the maximum matching degree. Since the current driving behavior and the historical driving behavior of the user are relatively similar, the server may perform vehicle speed correction on a current vehicle speed corresponding to the current vehicle trajectory data based on a historical vehicle speed corresponding to the target vehicle trajectory data, to obtain a corrected vehicle speed of the target vehicle in the current travel scenario. The performing vehicle speed correction calculation may be to perform weighted summation on the historical vehicle speed and the current vehicle speed to obtain the corrected vehicle speed. It may be understood that, the current vehicle speed is an instantaneous speed, which may be a vehicle speed that suddenly changes. The vehicle speed that suddenly changes is a travel speed that cannot reflect a travel speed of the target vehicle in a current travel scenario well, and the travel speed and a historical vehicle speed of the target vehicle may be relatively close in the same travel scenario. In this case, the current vehicle speed may be corrected based on the historical vehicle speed to a certain extent, to accurately reflect a travel speed of the target vehicle in a current travel scenario within a current time period.

In this embodiment, trajectory matching is performed on the current vehicle trajectory data and the each piece of historical vehicle trajectory data in the historical vehicle trajectory data set to obtain a plurality of matching degrees, the historical vehicle trajectory data corresponding to the maximum matching degree is used as target vehicle trajectory data, the target travel scenario corresponding to the target vehicle trajectory data is used as the current travel scenario, and vehicle speed correction calculation is performed on the current vehicle speed corresponding to the current vehicle trajectory data based on the historical vehicle speed corresponding to the target vehicle trajectory data, to obtain the corrected vehicle speed. In this way, since users' driving behaviors, vehicle trajectories, and vehicle speeds in the same travel scenario are similar to a certain extent, a current travel scenario may be quickly and accurately determined by performing trajectory matching on the current vehicle trajectory data and the historical vehicle trajectory data, and a relatively accurate and meaningful corrected vehicle speed may be obtained by performing correction calculation on the current vehicle speed based on the historical vehicle speed, so that the accuracy of information recommendation may be improved based on the current travel scenario and the corrected vehicle speed.

In an embodiment, the performing vehicle speed correction on a current vehicle speed corresponding to the current vehicle trajectory data based on a historical vehicle speed corresponding to the target vehicle trajectory data, to obtain the corrected vehicle speed includes: obtaining current road information; and performing vehicle speed correction on the current vehicle speed based on the current road information and the historical vehicle speed, to obtain the corrected vehicle speed.

The current road information is relevant information of a road on which the target vehicle is currently traveling. The current road information may include at least one type of information such as a current road condition, or a road attribute. The road condition refers to a congestion condition of the road. The road attribute includes at least one type of information such as a road type (for example, an urban road, a rural road, an expressway, a school section, and the like), a road allowed driving direction (for example, a one-way street, a two-way street, and the like), or a road width.

Specifically, in addition to performing vehicle speed correction on the current vehicle speed based on the historical vehicle speed, vehicle speed correction calculation may further be performed on the current vehicle speed with reference to the current road information. The server may obtain the current road information through at least one of a map server, a server corresponding to a traffic department, or a road image shot by the target vehicle, and perform vehicle speed correction on the current vehicle speed based on the current road information and the historical vehicle speed, to obtain the corrected vehicle speed. The performing vehicle speed correction calculation may be to perform weighted summation on the current road information, the historical vehicle speed, and the current vehicle speed, to obtain the corrected vehicle speed. Weights corresponding to the current road information, the historical vehicle speed, and the current vehicle speed may be set by professionals according to an actual situation, or may be obtained by calculating through a self-defining formula.

It may be understood that road attributes of each road are stored in various map software and the traffic departments, and a real-time road condition may be obtained in real time, and therefore the current road information may be obtained from the map server and the server corresponding to a traffic department. In addition, the server may also receive a road image captured by a camera arranged around a vehicle body of the target vehicle, and determine the current road information based on the road image. For example, when a number of a current road (for example, Y002 representing a rural road), or a name of a road (for example, Nanshan Avenue), or road prompt information (for example, a school section ahead, please slow down), character recognition may be performed on the road image, and a road type of the current road may be obtained based on recognized characters. When lane lines and landmarks are captured in the road image, lane line recognition and landmark recognition may be performed on the road image, and a road allowed driving direction and a road width of the current road are obtained based on the recognized the lane lines and landmarks. When surrounding traveling vehicles are captured in the road image, vehicle recognition may be performed on the road image to obtain surrounding traveling vehicles on the current road, and a current road condition is determined based on a quantity of the surrounding traveling vehicles and a road attribute. Character recognition, lane line recognition, landmark recognition, and vehicle recognition may be performed through one or more specific algorithms in machine learning and deep learning, such as a support vector machine algorithm, an AdaBoosting algorithm, a convolution neural network algorithm, and the like.

In this embodiment, the corrected vehicle speed is obtained by performing vehicle speed correction on the current vehicle speed based on the current road information and the historical vehicle speed. In this way, in consideration of the current road information, the historical vehicle speed, and the current vehicle speed, the current vehicle speed is corrected with reference to factors that may affect the vehicle speed, so that a more accurate corrected vehicle speed can be obtained, thereby improving the accuracy of information recommendation.

Figure 4:
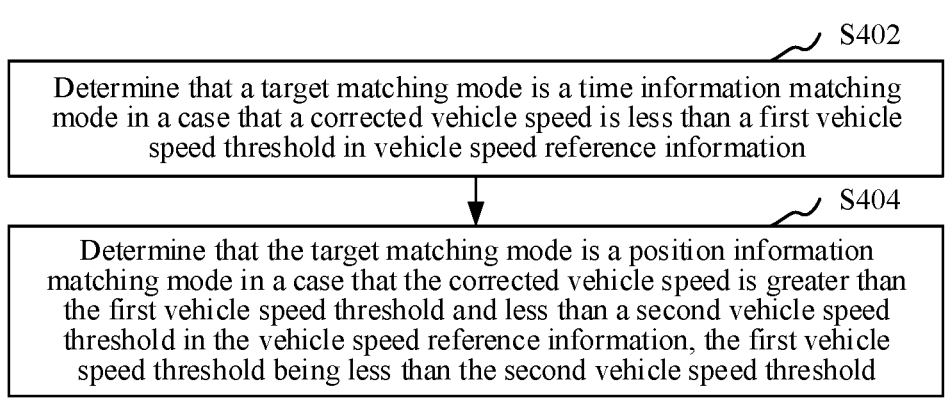
FIG. 4 is a schematic flowchart of determining a target matching mode according to an embodiment.

In an embodiment, as shown in FIG. 4, the determining a target matching mode of the current vehicle trajectory data and the current vehicle status data based on the corrected vehicle speed and the vehicle speed reference information includes:

Step S402: Determine that the target matching mode is a time information matching mode when the corrected vehicle speed is less than a first vehicle speed threshold in the vehicle speed reference information.

Step S404: Determine that the target matching mode is a position information matching mode when the corrected vehicle speed is greater than the first vehicle speed threshold and less than a second vehicle speed threshold in the vehicle speed reference information, the first vehicle speed threshold being less than the second vehicle speed threshold.

Specifically, the vehicle speed reference information includes a first vehicle speed threshold and a second vehicle speed threshold, the first vehicle speed threshold being less than the second vehicle speed threshold. When the corrected vehicle speed of the target vehicle is less than the first vehicle speed threshold, it indicates that a travel speed of the target vehicle is relatively slow and position information of the target vehicle does not greatly change, and in this case, it may be determined that the target matching mode is the time information matching mode, and target matching vehicle trajectory data corresponding to the current vehicle status data is obtained from the current vehicle trajectory data based on time information of the vehicle trajectory data and the vehicle status data. When the corrected vehicle speed of the target vehicle is greater than the first threshold and less than the second threshold, it indicates that the travel speed of the target vehicle is relatively fast and the position information of the target vehicle greatly changes, and in this case, it may be determined that the target matching mode is the position information matching mode, and target matching vehicle trajectory data corresponding to the current vehicle status data is obtained from the current vehicle trajectory data based on position information of the vehicle trajectory data and the vehicle status data.

In this embodiment, a current most suitable target matching mode may be quickly determined by comparing vehicle speed thresholds in the corrected vehicle speed and the vehicle speed reference information.

In an embodiment, the current vehicle trajectory data includes a plurality of pieces of current vehicle trajectory subdata, each piece of current vehicle trajectory subdata carries a data generation time, the current vehicle status data carries a data arrival time, and when the target matching mode is a time information matching mode, the obtaining target matching vehicle trajectory data corresponding to the current vehicle status data from the current vehicle trajectory data according to the target matching mode includes: calculating a corresponding time gap between the current vehicle status data and each current vehicle trajectory subdata according to the data generation time and the data arrival time; using current vehicle trajectory subdata corresponding to a minimum time gap as the target matching vehicle trajectory data.

The data generation time is a time at which a sensor of the target vehicle acquires data. The data arrival time is a time at which data arrives at the server.

Specifically, the current vehicle trajectory data includes a plurality of pieces of current vehicle trajectory subdata, each piece of current vehicle trajectory subdata carries a corresponding data generation time, and the current vehicle status data carries a corresponding data arrival time. When the target matching mode is the time information matching mode, the server may calculate the corresponding time gap between the current vehicle status data and the each current vehicle trajectory subdata according to the data generation time of the current vehicle trajectory subdata and the data arrival time of the current vehicle status data, to further use current vehicle trajectory subdata corresponding to the minimum time gap as the target matching vehicle trajectory data.

When there are two or more minimum time gaps, current vehicle trajectory subdata with the latest data generation time may be selected from a plurality of pieces of current vehicle trajectory subdata corresponding to the minimum time gaps as the target matching vehicle trajectory data. For example, a time gap between current vehicle trajectory subdata t1 and current vehicle status data T1 is the same as a time gap between current vehicle trajectory subdata t2 and current vehicle status data T1, which are both minimum values. However, a data generation time of the current vehicle trajectory subdata t1 is earlier than that of the current vehicle trajectory subdata t2, and in this case, the current vehicle trajectory subdata t2 may be used as target matching vehicle trajectory data of the current vehicle status data T1.

Figure 5:
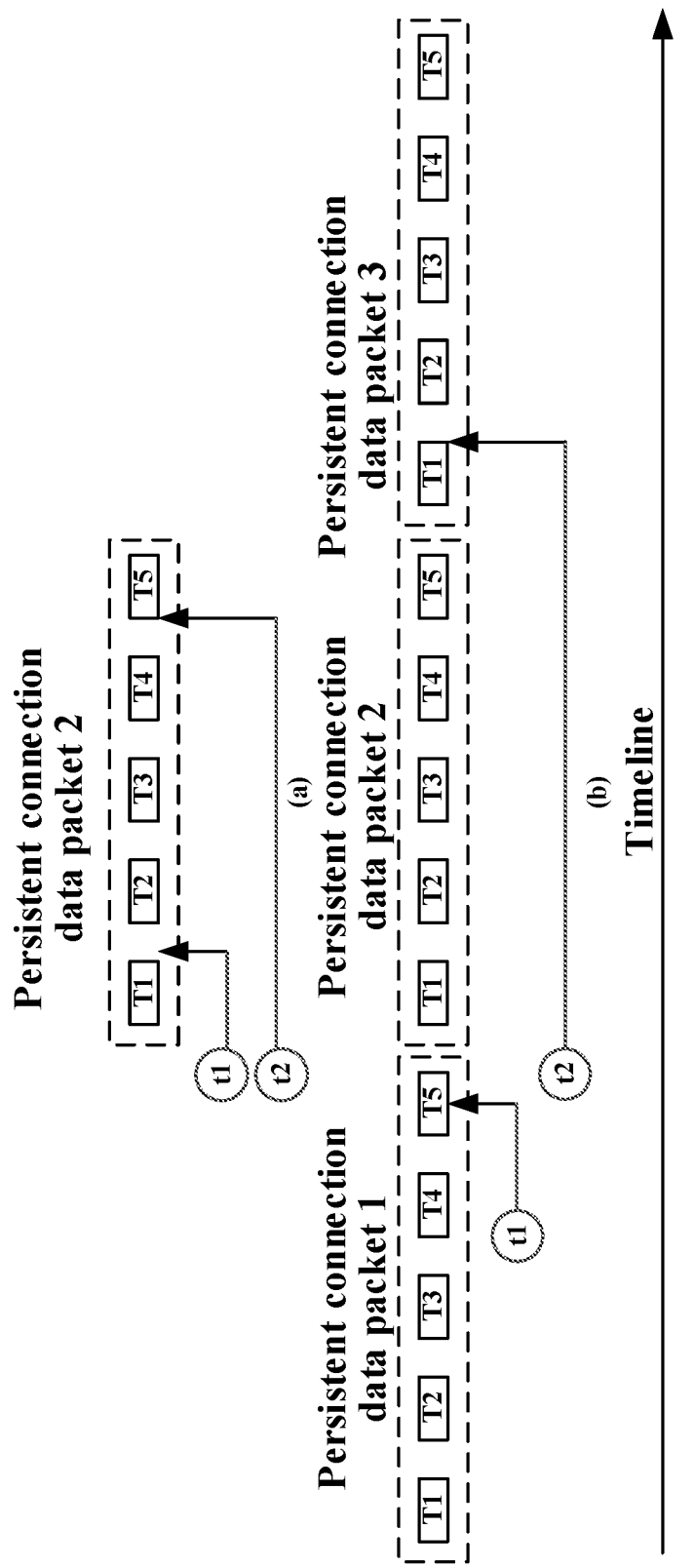
FIG. 5 is a schematic diagram of associating vehicle status data with vehicle trajectory data according to an embodiment.

It may be understood that, when the target matching mode is the time information matching mode, the server may also calculate the corresponding time gap between the current vehicle status data and the each current vehicle trajectory subdata according to the data generation time of the current vehicle trajectory subdata and the data generation time of the current vehicle status data, to further use current vehicle trajectory subdata corresponding to the minimum time gap as the target matching vehicle trajectory data. However, according to a large amount of experimental observations, it may be learned that, since transmission channels of the vehicle trajectory data and the vehicle status data are different, and corresponding senders are different, data transmission of the vehicle trajectory data and the vehicle status data has different degrees of delay. As a result, it is difficult for vehicle trajectory data and vehicle status data simultaneously acquired to simultaneously arrive at the server. Referring to FIG. 5, (a) of FIG. 5 is in an ideal state, when there is no data transmission delay, according to the data generation time, vehicle status data t1 is to be mounted on vehicle trajectory data T1 of a persistent connection data packet 2, and vehicle status data t2 is to be mounted on vehicle trajectory data T5 of the persistent connection data packet 2. However, in an actual situation, referring to (b) of FIG. 5, the vehicle status data t1 may arrive in advance, the persistent connection data packet 2 in this case has not yet arrived at the server in this case, and the vehicle status data t2 may arrive late, or the persistent connection data packet 2 has arrived at the server, but the vehicle status data t2 has been used for information recommendation. Therefore, when the target matching mode is the time information matching mode, the server may obtain current vehicle trajectory subdata corresponding to the current vehicle status data from the current vehicle trajectory data based on the data generation time of the current vehicle trajectory subdata and the data arrival time of the current vehicle status data. Most of the vehicle status data may be more accurately mounted on current most suitable vehicle trajectory data based on the data generation time of the vehicle trajectory data and the data arrival time of the vehicle status data.

In this embodiment, when the target matching mode is the time information matching mode, the corresponding time gap between the current vehicle status data and the each current vehicle trajectory subdata is calculated according to the data generation time of the vehicle trajectory data and the data arrival time of the vehicle status data, to further use current vehicle trajectory subdata corresponding to the minimum time gap as the target matching vehicle trajectory data, so that the current vehicle status data can be mounted on the current most suitable vehicle trajectory data, thereby improving matching accuracy between the vehicle trajectory data and the vehicle status data.

In an embodiment, the current vehicle trajectory data includes a plurality of pieces of current vehicle trajectory subdata, each piece of current vehicle trajectory subdata and the current vehicle status data both carry vehicle position information, and when the target matching mode is a position information matching mode, the obtaining target matching vehicle trajectory data corresponding to the current vehicle status data from the current vehicle trajectory data according to the target matching mode includes: calculating a corresponding vehicle position gap between the current vehicle status data and each current vehicle trajectory subdata according to the vehicle position information; and using current vehicle trajectory subdata corresponding to a minimum vehicle position gap as the target matching vehicle trajectory data.

The vehicle position information is geographic position information of the vehicle, which may specifically be longitude and latitude information. It may be understood that, the vehicle trajectory data and the vehicle status data may both carry longitude and latitude information of the vehicle during data generation.

Specifically, the current vehicle trajectory data includes a plurality of pieces of current vehicle trajectory subdata, each piece of current vehicle trajectory subdata carries corresponding vehicle position information, and the current vehicle status data carries corresponding vehicle position information. When the target matching mode is the position information matching mode, the server may calculate the vehicle position gap between the current vehicle status data and the each current vehicle trajectory subdata according to the vehicle position information of the current vehicle trajectory subdata and the vehicle position information of the current vehicle status data, to further use current vehicle trajectory subdata corresponding to the minimum vehicle position gap as the target matching vehicle trajectory data.

When there are two or more minimum vehicle position gaps, current vehicle trajectory subdata with the latest data generation time may be selected from a plurality of pieces of current vehicle trajectory subdata corresponding to the minimum vehicle position gaps as the target matching vehicle trajectory data. For example, a time gap between current vehicle trajectory subdata t1 and current vehicle status data T1 is the same as a vehicle position gap between current vehicle trajectory subdata t2 and current vehicle status data T1, which are both minimum values. However, a data generation time of the current vehicle trajectory subdata t1 is earlier than that of the current vehicle trajectory subdata t2, and in this case, the current vehicle trajectory subdata t2 may be used as target matching vehicle trajectory data of the current vehicle status data T1.

In this embodiment, when the target matching mode is the position information matching mode, the corresponding vehicle position gap between the current vehicle status data and the each current vehicle trajectory subdata is calculated according to the vehicle position information, to further use current vehicle trajectory subdata corresponding to the minimum vehicle position gap as the target matching vehicle trajectory data, so that the current vehicle status data can be mounted on the current most suitable vehicle trajectory data, thereby improving matching accuracy between the vehicle trajectory data and the vehicle status data.

Figure 6:
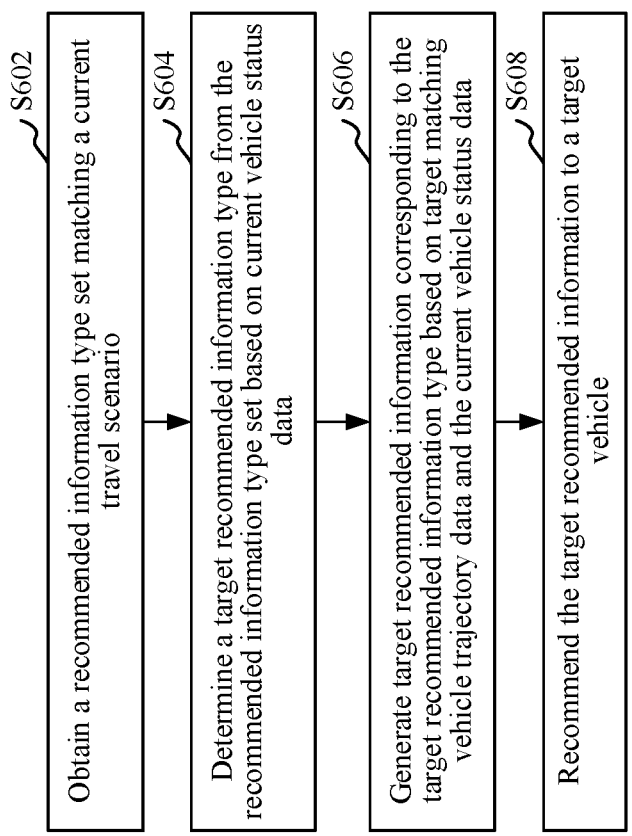
FIG. 6 is a schematic flowchart of recommending information to a target vehicle based on target matching vehicle trajectory data, current vehicle status data, and a current travel scenario according to an embodiment.

In an embodiment, as shown in FIG. 6, the transmitting recommended information to the target vehicle based on the target matching vehicle trajectory data, the current vehicle status data, and the current travel scenario includes:

Step S602: Obtain a recommended information type set matching the current travel scenario.

Step S604: Determine a target recommended information type from the recommended information type set based on the current vehicle status data.

Step S606: Generate target recommended information corresponding to the target recommended information type based on the target matching vehicle trajectory data and the current vehicle status data.

Step S608: Recommend the target recommended information to the target vehicle.

The recommended information type is an information type of the recommended information. The recommended information type includes at least one type of information such as navigation type information for navigation, leisure and entertainment type information for leisure and entertainment, early-warning type information for warning in advance, or the like. The leisure and entertainment type information may further be subdivided into food information for food recommendation, song information for song recommendation, broadcast information for broadcast recommendation, and leisure place information for leisure place recommendation. The early-warning type information may further be subdivided into weather early warning information for weather recommendation, vehicle refueling early warning information for vehicle refueling recommendation, and vehicle warranty information for vehicle warranty recommendation.

Specifically, a correspondence and matching relationship between various travel scenarios and various types of recommended information may be preset and stored in the server. After determining a current travel scenario of the target vehicle, the server may obtain a recommended information type set matching the current travel scenario, the recommended information type set including each recommended information type matching the current travel scenario. A trigger condition for each recommended information type includes vehicle trajectory data, or specific vehicle status data, or a specific vehicle status data type, for example, a trigger condition for weather recommendation is a vehicle window status, where the vehicle window may be opened or closed, a trigger condition for food recommendation is that a food application is opened, and a trigger condition for vehicle refueling recommendation is that fuel capacity is lower than 30%. Therefore, the server may determine the target recommended information type from the recommended information type set based on the current vehicle status data, and use a recommended information type corresponding to the vehicle status data of the current vehicle status data as the target recommended information type. Further, the server may generate target recommended information corresponding to the target recommended information type based on the target matching vehicle trajectory data and the current vehicle status data, and recommend the target recommended information to the target vehicle, so that the target vehicle may display the target recommended information to a current driving user of the target vehicle.

For example, when the user opens the vehicle window and a local weather forecast for thunderstorm, the server may transmit target recommended information to the target vehicle, the target recommended information being used for prompting the user to close the vehicle window and there will be thunderstorms. When the fuel capacity is lower than 30%, the server may transmit the target recommended information to the target vehicle, the target recommended information being used for reminding the user that current fuel capacity of the vehicle is relatively low and providing a navigation route to nearby gas stations.

In an embodiment, different types of the target vehicles may perform different information recommendation operations in the same travel scenario. For example, leisure and entertainment type information is forbidden to be recommended to a vehicle providing security services, to avoid affecting quality of the security services. Therefore, the server may further store a correspondence and matching relationship between various vehicle types, travel scenarios, and recommended information. Further, during information recommendation, the server may obtain a recommended information type set matching a current vehicle and a current travel scenario, determine a target recommended information type from the recommended information type set based on current vehicle status data, generate target recommended information corresponding to the target recommended information type based on target matching vehicle trajectory data and the current vehicle status data, and recommend the target recommended information to the target vehicle.

In an embodiment, to provide better information recommendation service to the target vehicle and the current driving user, priorities corresponding to various recommended information types may be preset, so that the target recommended information may be sequentially transmitted to the target vehicle according to a priority corresponding to each piece of target recommended information when there are a plurality of pieces of target recommended information. For example, a priority corresponding to the early warning information may be set to the highest, and a priority corresponding to the leisure and entertainment information may be set to the lowest.

In this embodiment, a recommended information type set matching the current travel scenario is obtained, a target recommended information type is determined from the recommended information type set based on current vehicle status data, target recommended information corresponding to the target recommended information type is generated based on target matching vehicle trajectory data and the current vehicle status data, and the target recommended information is recommended to the target vehicle. In this way, the recommended information type set may be selected from a large number of candidate recommended types based on the current travel scenario in advance, and then the target recommended information type is quickly selected from the recommended information type set based on the current vehicle status data, so that the target recommended information corresponding to the target recommended information type can be quickly generated, thereby improving the accuracy and the efficiency of information recommendation.

In an embodiment, the determining a target recommended information type from the recommended information type set based on the current vehicle status data includes: obtaining an information configuration table corresponding to the recommended information type set, the information configuration table including a reference vehicle status data type corresponding to each recommended information type; and obtaining a reference vehicle status data type corresponding to the current vehicle status data from the information configuration table as a target vehicle status data type, and using a recommended information type corresponding to the target vehicle status data type as the target recommended information type.

The information configuration table is used for setting a correspondence between each recommended information type and each reference vehicle status data type. The reference vehicle status data type is a data type of vehicle status data corresponding to a recommended information type. It may be understood that, a vehicle window status, a vehicle fuel capacity status, a vehicle door status, and a vehicle lock status are all different vehicle status data types.

Specifically, a correspondence between each recommended information type and each reference vehicle status data type may be preset, and the correspondence may be stored in the server in a table. When determining the target recommended information type, the server may obtain the information configuration table that stores each recommended information type and a corresponding reference vehicle status data type in the recommended information type set, query a reference vehicle status data type corresponding to the current vehicle status data from the information configuration table, use the queried reference vehicle status data type as a target vehicle status data type, and use a recommended information type corresponding to the target vehicle status data type as the target recommended information type. For example, the current vehicle status data type is a vehicle fuel capacity status, by querying the information configuration table, it may be learned that, a reference vehicle status data type corresponding to vehicle refueling early warning information is the vehicle fuel capacity status. Therefore, it may be determined that the target recommended information type is the vehicle refueling early warning information.

In this embodiment, the target recommended information type may be quickly determined from the preset information configuration table based on the current vehicle status data type.

Figure 7:
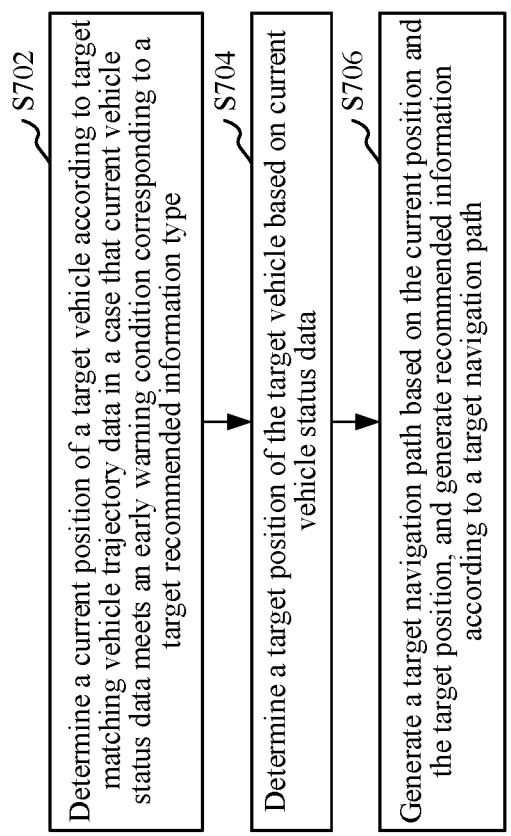
FIG. 7 is a schematic flowchart of generating target recommended information corresponding to a target recommended information type based on target matching vehicle trajectory data and current vehicle status data according to an embodiment.

In an embodiment, as shown in FIG. 7, the generating target recommended information corresponding to the target recommended information type based on the target matching vehicle trajectory data and the current vehicle status data includes:

Step S702: Determine a current position of the target vehicle according to the target matching vehicle trajectory data when the current vehicle status data meets an early warning condition corresponding to the target recommended information type.

Step S704: Determine a target position of the target vehicle based on the current vehicle status data.

Step S706: Generate a target navigation path based on the current position and the target position, and generate target recommended information according to the target navigation path.

The early warning condition is a condition set to prevent potential safety hazards of the vehicle, which is used for generating target recommended information with early warning meaning before potential safety hazards of occur in the vehicle. When the vehicle status data meets the early warning condition corresponding to the recommended information type, corresponding recommended information may be triggered to be generated.

Specifically, the server may generate the target recommended information based on current relevant information of the target vehicle when the current vehicle status data meets the early warning condition corresponding to the target recommended information type. The server may specifically determine a current position of the target vehicle, that is, a navigation starting point, according to the target matching vehicle trajectory data, determine a target position of the target vehicle, that is, a navigation end point, according to the current vehicle status data, generate a target navigation path according to the current position and the target position, that is, generating a navigation path according to the navigation starting point and the navigation end point, and finally generate the target recommended information according to the target navigation path. Further, when receiving the target recommended information, the target vehicle may travel to a destination according to instructions of the target navigation path, and further perform relevant processing on safety hazards.

For example, an early warning condition corresponding to vehicle refueling recommendation information is that the fuel capacity is lower than 30%, and the current vehicle status data may meet the early warning condition corresponding to the vehicle refueling recommendation information when the current vehicle status data is fuel capacity being lower than 20% In this case, the server may determine the current position of the target vehicle based on the target matching vehicle trajectory data, determine a remaining travel range of the target vehicle based on the current vehicle status data, search for a gas station closest to the current position within the remaining travel range or all gas stations within the remaining travel range, use a position of the gas station as a target position (destination) of the target vehicle, generate a navigation path to the gas station according to the current position and the target position of the target vehicle, and generate the target recommended information based on the navigation path. After receiving the target recommended information, the target vehicle may perform voice playback "The current fuel capacity is low, and you have been provided with the navigation path of the nearby gas station, please refuel in time" for a current driving user, and display screen a corresponding navigation path on a display screen of the target vehicle. When there are a plurality of navigation paths, key information corresponding to each navigation path may be displayed on the display screen of the target vehicle, so that user can select the most desired gas station and a corresponding navigation path.

An early warning condition corresponding to vehicle warranty recommendation information is at least one vehicle component being abnormal and abnormal status data corresponding to the each vehicle component. The current vehicle status data is a wheel air pressure being A, abnormal status data corresponding to the wheel air pressure in the early warning condition is lower than B or higher than C, and when A is less than B, it may be determined that the current vehicle status data meets the early warning condition corresponding to the vehicle refueling recommendation information. In this case, the server may determine the current position of the target vehicle based on the target matching vehicle trajectory data, determine a remaining travel range of the target vehicle based on the current vehicle status data, search for a vehicle repair shop closest to the current position within the remaining travel range or all vehicle repair shops within the remaining travel range, use a position of the vehicle repair shop as a target position (destination) of the target vehicle, generate a navigation path to the vehicle repair shop according to the current position and the target position of the target vehicle, and generate the target recommended information based on the navigation path. After receiving the target recommended information, the target vehicle may perform voice playback "The current wheel air pressure is low, and you have been provided with the navigation path of the nearby vehicle repair shop, please inspect and repair the wheels in time" for a current driving user, and display screen a corresponding navigation path on a display screen of the target vehicle. When there are a plurality of navigation paths, key information corresponding to each navigation path may be displayed on the display screen of the target vehicle, so that user can select the most desired vehicle repair shop and a corresponding navigation path.

In this embodiment, when the current vehicle status data meets an early warning condition corresponding to the target recommended information type, a target navigation path is generated based on the target matching vehicle trajectory data and the current vehicle status data, and the target recommended information is generated according to the target navigation path. In this way, before the potential safety hazards occur in the target vehicle, the current driving user is automatically reminded to inspect and repair in time, thereby improving the driving safety of the vehicle.

In an embodiment, the generating target recommended information corresponding to the target recommended information type based on the target matching vehicle trajectory data and the current vehicle status data includes: obtaining user information of a current driving user of the target vehicle; and generating the target recommended information based on the user information, the target matching vehicle trajectory data, and the current vehicle status data.

The user information of the current driving user includes at least one of age, occupation, educational background, gender, region, hobby, or the like.

Specifically, the server may obtain the user information of the current driving user from registered account information of each vehicle application, or may establish user information according to a historical user behavior and a current user behavior of the current driving user, for example, the current driving user likes to play light music while driving. Further, when transmitting recommended information to the target vehicle, in addition to generating the target recommended information corresponding to the target recommended information type based on the target matching vehicle trajectory data and the current vehicle status data, the server may further generate the target recommended information corresponding to the target recommended information type with reference to the user information of the current driving user, to generate target recommended information better matching the current driving user, thereby providing more effective information recommendation. For example, the current driving user likes to listen to light music, and recent popular light music is automatically recommended to the current driving user during song recommendation.

In this embodiment, the target recommended information is generated based on the user information, the target matching vehicle trajectory data, and the current vehicle status data, so that more effective and easily adopted information recommendation can be performed on the current driving user, thereby improving the effectiveness of information recommendation.

Figure 8:
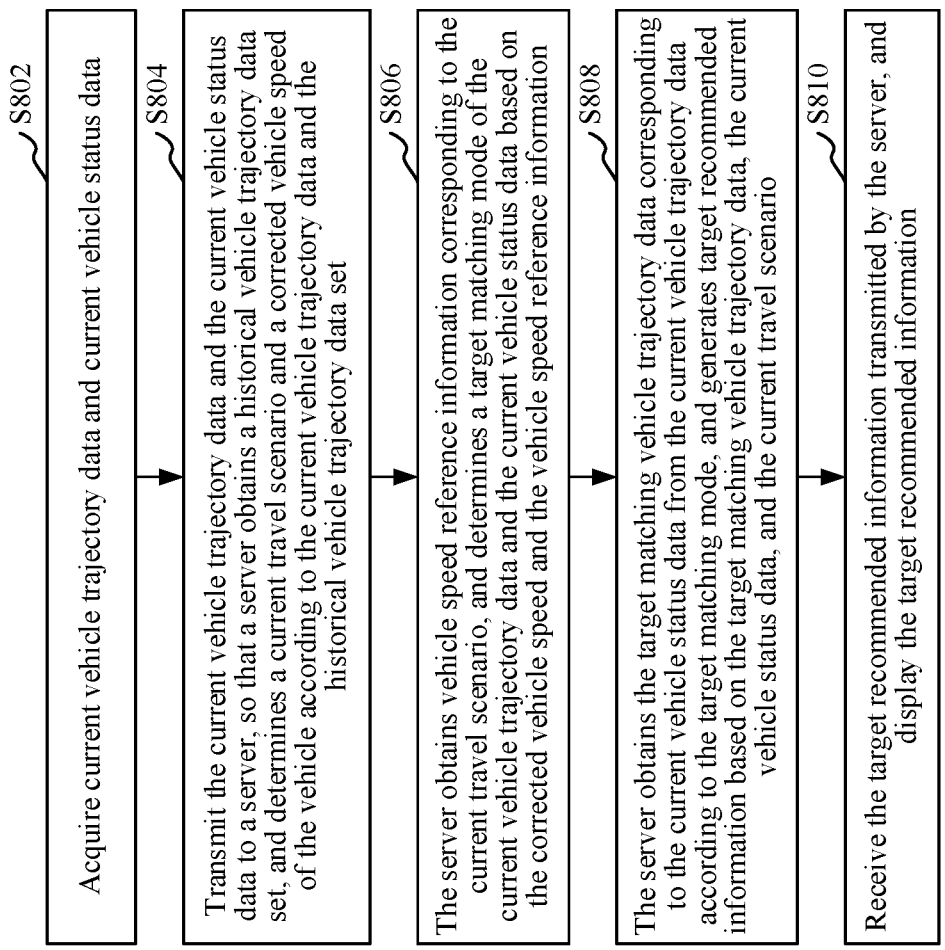
FIG. 8 is a schematic flowchart of a vehicle data processing method according to another embodiment.

In an embodiment, as shown in FIG. 8, a vehicle data processing method is provided. A description is provided by using an example in which the terminal shown in FIG. 1 to which the method is applied is a vehicle, and the method includes the following steps:

Step S802: Acquire current vehicle trajectory data and current vehicle status data.

Step S804: Transmit the current vehicle trajectory data and the current vehicle status data to a server, so that a server obtains a historical vehicle trajectory data set, and determines a current travel scenario and a corrected vehicle speed of the vehicle according to the current vehicle trajectory data and the historical vehicle trajectory data set.

Step S806: The server obtains vehicle speed reference information corresponding to the current travel scenario, and determines a target matching mode of the current vehicle trajectory data and the current vehicle status data based on the corrected vehicle speed and the vehicle speed reference information.

Step S808: The server obtains the target matching vehicle trajectory data corresponding to the current vehicle status data from the current vehicle trajectory data according to the target matching mode, and generates target recommended information based on the target matching vehicle trajectory data, the current vehicle status data, and the current travel scenario.

Step S810: Receive the target recommended information transmitted by the server, and display the target recommended information.

Specifically, a vehicle may acquire current vehicle trajectory data and current vehicle status data through various sensors arranged inside and outside the vehicle, and upload the acquired current vehicle trajectory data and current vehicle status data to the server.

Since driving behaviors of the user has certain regularity, the historical vehicle trajectory data in the historical vehicle trajectory data set may reflect regular driving behaviors of the user. Therefore, after receiving the current vehicle trajectory data and the current vehicle status data, the server may obtain a historical vehicle trajectory data set, and determine a current travel scenario and a corrected vehicle speed of the vehicle according to the current vehicle trajectory data and the historical vehicle trajectory data set. The determining a current travel scenario may specifically be to perform trajectory matching between the current vehicle trajectory data and each piece of historical vehicle trajectory data in the historical vehicle trajectory data set, to use a target travel scenario corresponding to historical vehicle trajectory data corresponding to a maximum matching degree as the current travel scenario of the vehicle. The determining a corrected vehicle speed may specifically be to perform vehicle speed correction on a current vehicle speed corresponding to the current vehicle trajectory data based on a historical vehicle speed corresponding to the target vehicle trajectory data, to obtain the corrected vehicle speed.

Since the current vehicle trajectory data and the current vehicle status data are two different types of data, and the current vehicle trajectory data and the current vehicle status data are usually not reported by the same sender, it is necessary to better associate and match the current vehicle trajectory data and the current vehicle status data, to recommend information more accurately and effectively. To determine the target matching mode, the server may obtain vehicle speed reference information corresponding to the current travel scenario, and determine a target matching mode of the current vehicle trajectory data and the current vehicle status data based on the corrected vehicle speed and the vehicle speed reference information. After determining the target matching mode, the server may obtain the target matching vehicle trajectory data corresponding to the current vehicle status data from the current vehicle trajectory data according to the target matching mode, and accurately and effectively recommend information to the target vehicle based on the target matching vehicle trajectory data, the current vehicle status data, and the current travel scenario.

It may be understood that, for a specific process in which the server performs processing on relevant data of the vehicle to obtain the target recommended information, reference may be made to a relevant embodiment that describes the vehicle data processing method by using an example in which the method is applicable to the server.

In an embodiment, the transmitting the current vehicle trajectory data and the current vehicle status data to a server includes: transmitting the current vehicle trajectory data to the server through a persistent connection; and transmitting the current vehicle status data to the server through a short connection.

Specifically, the vehicle trajectory data is trajectory data generated in real time, and the vehicle status data is status data generated irregularly. It may be understood that the vehicle trajectory data is continuously generated once the vehicle starts, but the vehicle status data may be generated only when a status changes, for example, corresponding status data is generated when a vehicle window is detected to be opened, and corresponding status data is generated when fuel capacity is detected to be lower than 30%. To improve the efficiency of data transmission and reduce costs for data transmission, the vehicle trajectory data may be transmitted to the server through a persistent connection, and the vehicle status data may be transmitted to the server through a short connection. The persistent connection means that a plurality of data packets may be continuously transmitted through a communication connection, and the communication connection may not be closed after each communication is completed, so as to achieve multiplexing of the communication connection. Since the vehicle trajectory data is generated in real time, reporting the vehicle trajectory data of the vehicle through the persistent connection may shorten a time for creating a communication connection each time, thereby improving the efficiency of data transmission. The short connection means that after the communication connection is established, the communication connection is immediately disconnected once data is transmitted or received. Since the vehicle status data is disconnected generated, reporting the vehicle status data of the vehicle through the short connection may avoid waste of communication connection, and the communication connection is established only when needed, which can reduce costs for data transmission.

In an embodiment, the persistent connection may be established based on a message queuing telemetry transport (MQTT) protocol, and the vehicle trajectory data is transmitted through the persistent connection. The short connection may be established based on a hypertext transfer protocol (HTTP), and the vehicle status data is transmitted through the short connection.

Figure 9:
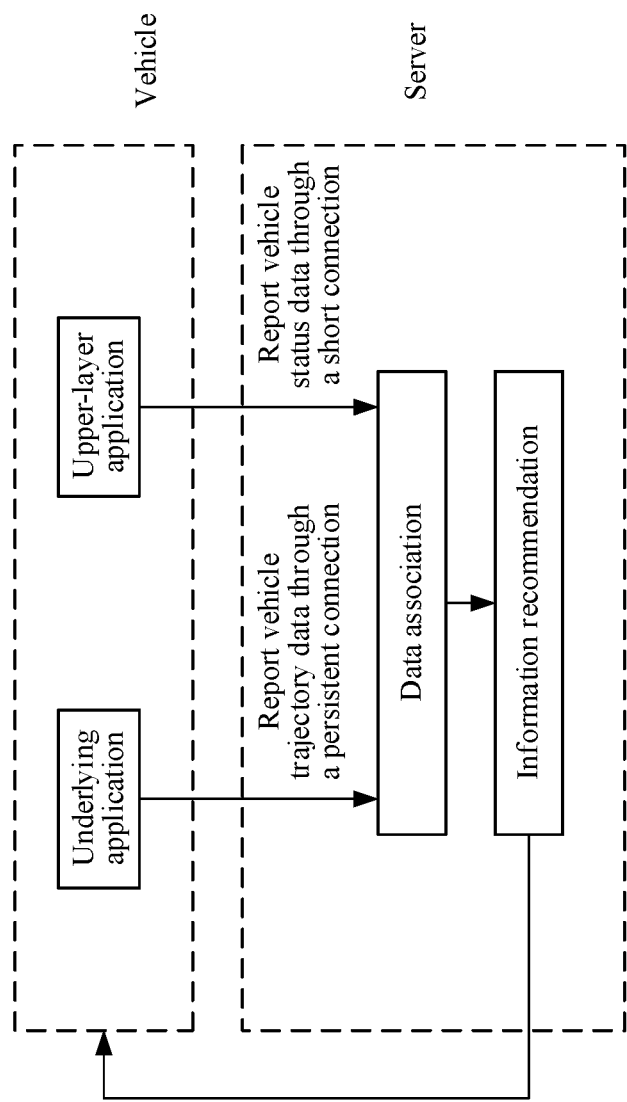
FIG. 9 is a schematic flowchart of a vehicle data processing method according to still another embodiment.

Referring to FIG. 9, an underlying application of the vehicle may report vehicle trajectory data to the server through a persistent connection, and an upper-layer application of the vehicle may report vehicle status data to the server through a short connection. Since reporting manners, reporting bodies, and reporting frequencies of the vehicle trajectory data and the vehicle status data are different, the server needs to perform data association and matching on the vehicle trajectory data and the vehicle status data before recommending information based on the vehicle trajectory data and the vehicle status data. After performing data association, the server may generate accurate target recommended information based on the accurately matched and associated vehicle trajectory data and vehicle status data, to perform more accurate and effective information recommendation to the vehicle.

The vehicle data processing method includes: acquiring current vehicle trajectory data and current vehicle status data; transmitting the current vehicle trajectory data and the current vehicle status data to a server, so that the server obtains a historical vehicle trajectory data set, and determines a current travel scenario and a corrected vehicle speed of the vehicle according to the current vehicle trajectory data and the historical vehicle trajectory data set; obtains vehicle speed reference information corresponding to the current travel scenario, and determines a target matching mode of the current vehicle trajectory data and the current vehicle status data based on the corrected vehicle speed and the vehicle speed reference information; obtains target matching vehicle trajectory data corresponding to the current vehicle status data from the current vehicle trajectory data according to the target matching mode; and generates recommended information based on the target matching vehicle trajectory data, the current vehicle status data, and the current travel scenario; and receiving the recommended information transmitted by the server, and displaying the recommended information. In this way, the current travel scenario of the vehicle is determined based on the current vehicle trajectory data and the historical vehicle trajectory data set of the target vehicle, and the current vehicle speed of the target vehicle may be corrected based on the current vehicle trajectory data and the historical vehicle trajectory data set of the target vehicle, to obtain a corrected vehicle speed that is more accurate and can better reflect an overall travel speed of the target vehicle in the current travel scenario. Further, the target matching mode of the current vehicle trajectory data and the current vehicle status data may be determined based on the current travel scenario and the corrected vehicle speed of the target vehicle, the current vehicle trajectory data and the current vehicle status data may be associated more accurately based on the target matching mode, and the target matching vehicle trajectory data matching the current vehicle status data may be determined more accurately, so that more accurate information recommendation may be performed on the target vehicle based on accurately matched current vehicle status data and target matching vehicle trajectory data, and the current travel scenario, thereby improving the accuracy and effectiveness of information recommendation.

Figure 10:
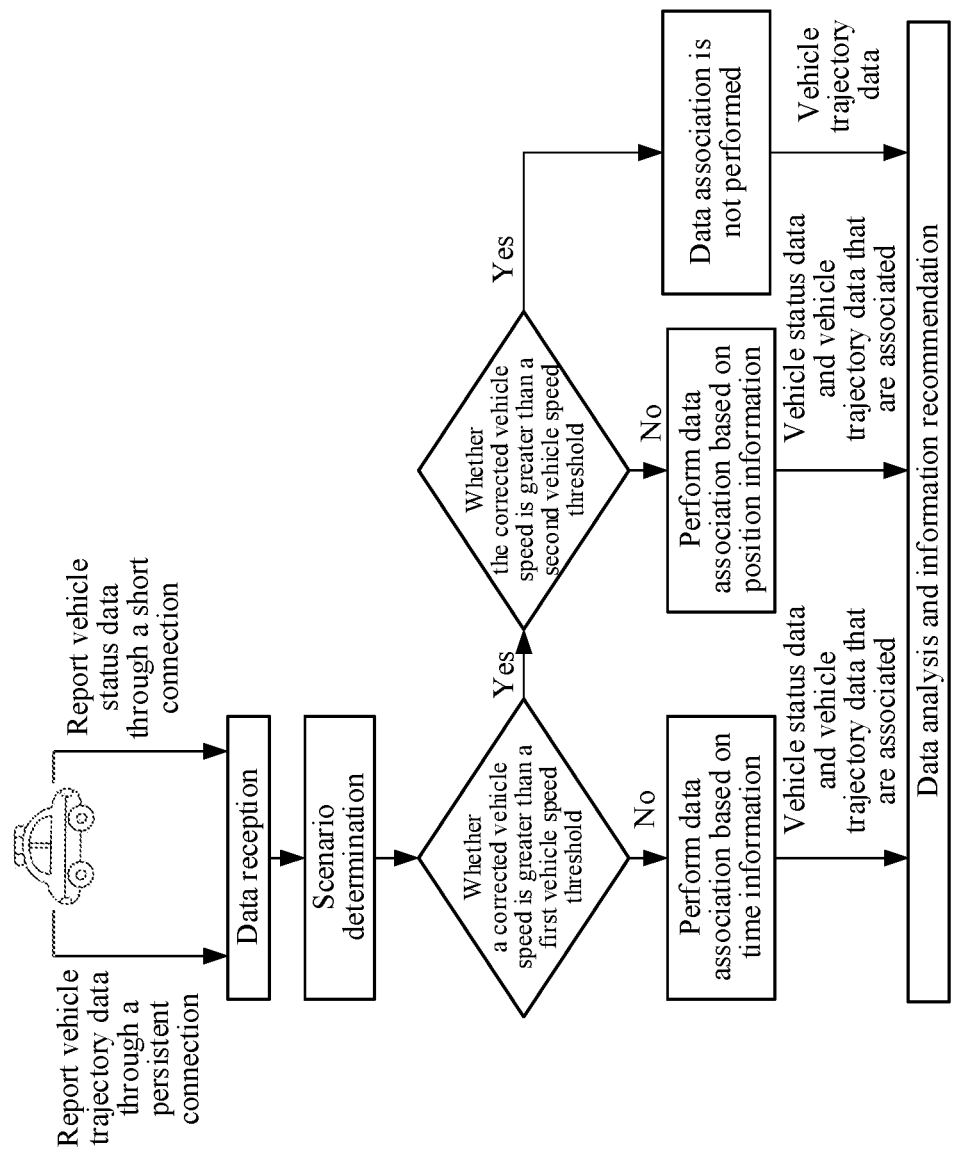
FIG. 10 is a schematic flowchart of a vehicle data processing method according to an embodiment.

This application further provides an application scenario applicable to the foregoing vehicle data processing method. As shown in FIG. 10, a specific procedure of the vehicle data processing method may be as follows:

1. Data Reception

The vehicle reports vehicle trajectory data to the server through a persistent connection, and reports vehicle status data to the server through a short connection. The vehicle trajectory data may be a vehicle trajectory data packet (persistent connection data) of a fixed frequency of 5 s once, and each vehicle trajectory data packet includes vehicle trajectory data of each second t1, t2, t3, t4, and t5. The vehicle status data is short connection data that does not have a fixed frequency, and the vehicle status data may be synchronously transmitted only when a relevant status of the vehicle changes.

2. Scenario Determination

The server may obtain a historical vehicle trajectory data set of the vehicle, obtain historical vehicle trajectory data besting matching a current vehicle trajectory data set from the historical vehicle trajectory data set as target vehicle trajectory data, and use a target travel scenario corresponding to the target vehicle trajectory data as the current travel scenario of the vehicle. When determining the target vehicle trajectory data, the server may perform trajectory matching on the current vehicle trajectory data and each piece of historical vehicle trajectory data to obtain a plurality of matching degrees, and use historical vehicle trajectory data corresponding to a maximum matching degree as the target vehicle trajectory data.

Further, the server may perform vehicle speed correction on a current vehicle speed corresponding to the current vehicle trajectory data based on a historical vehicle speed corresponding to the target vehicle trajectory data, to obtain the corrected vehicle speed. The server may also vehicle speed correction on the current vehicle speed based on the current road information and the historical vehicle speed, to obtain the corrected vehicle speed.

3. Data Association

The server obtains vehicle speed reference information corresponding to the current travel scenario, the vehicle speed reference information including a first vehicle speed threshold and a second vehicle speed threshold. When the corrected vehicle speed is less than the first vehicle speed threshold, it indicates that the vehicle speed is relatively slow and an instantaneous position of the vehicle does not greatly change, and in this case, the vehicle trajectory data and the vehicle status data may be associated based on time information, and specifically, data association may be performed based on a data generation time of the vehicle trajectory data and the vehicle status data, or data association may be performed based on a data arrival time of the vehicle trajectory data and the vehicle status data, or data association may be performed based on a data generation time of the vehicle trajectory data and a data arrival time of the vehicle status data. For example, time window comparison is performed on vehicle trajectory data t1, t2, t3, t4, and t5 and vehicle status data s. In a vehicle trajectory data packet, comparison is performed according to the data generation time of the vehicle trajectory data packet and the data arrival time of the vehicle status data, and the vehicle status data s is associated with vehicle trajectory data at the closest time point. When there are two or more pieces of vehicle trajectory data having the same time gap to the vehicle status data s in one vehicle trajectory data packet, vehicle trajectory data in the latest second is selected for mounting.

When the corrected vehicle speed is greater than the first vehicle speed threshold and less than the second vehicle speed threshold, it indicates that the vehicle speed is moderate and the instantaneous position of the vehicle greatly changes, and in this case, the vehicle trajectory data and the vehicle status data may be associated based on position information. For example, longitude and latitude information comparison is performed on the vehicle trajectory data t1, t2, t3, t4, and t5 and the vehicle status data s, and the vehicle status data is associated with vehicle trajectory data having the closest longitude and latitude. When there are two or more pieces of vehicle trajectory data having the same position gap to the vehicle status data s in one vehicle trajectory data packet, vehicle trajectory data in the latest second is selected for mounting.

When the corrected vehicle speed is greater than the second vehicle speed threshold, in indicates that the vehicle speed is relatively fast and a surrounding environment of the vehicle greatly changes, and in this case, data association may not be performed, and data analysis is performed based on the vehicle trajectory data and the current travel scenario, to generate corresponding target recommended information.

4. Data Analysis and Information Recommendation

Information recommendation is performed based on successfully mounted and associated vehicle trajectory data and vehicle status data, and specifically, target recommended information corresponding to the current travel scenario is generated based on the successfully mounted vehicle trajectory data and vehicle status data. Alternatively, information recommendation is performed based on vehicle trajectory data that fails in mounting, and specifically, the target recommended information corresponding to the current travel scenario may be generated based on the vehicle trajectory data.

For example, the current vehicle status data is the vehicle fuel capacity being lower than 30%, a corresponding target recommended information type is vehicle refueling recommendation information. In this case, the server may determine a current position of the vehicle based on the current vehicle trajectory data successfully mounted with the current vehicle status data, determine a remaining travel range of the vehicle based on the current vehicle status data, search for a gas station closest to the current position within the remaining travel range or all gas stations within the remaining travel range, use a position of the gas station as a target position (destination) of the vehicle, generate a navigation path to the gas station according to the current position and the target position of the vehicle, and generate the target recommended information based on the navigation path. After receiving the target recommended information, the vehicle may perform voice playback "The current fuel capacity is low, and you have been provided with the navigation path of the nearby gas station, please refuel in time" for a current driving user, and display screen a corresponding navigation path on a display screen of the target vehicle. When there are a plurality of navigation paths, key information corresponding to each navigation path may be displayed on the display screen of the target vehicle, so that user can select the most desired gas station and a corresponding navigation path.

The foregoing embodiments have at least the following technical effects:

1. Redundant transmission of a persistent connection is reduced, and there is no need to perform real-time transmission on vehicle status data not transmitted at higher frequency or vehicle status data slightly changing in a short time period, which can reduce data transmission costs and improving efficiency of data transmission.

2. In the conventional technology, both the vehicle status data and the vehicle trajectory data are transmitted through the persistent connection. However, an application, a transmission mechanism, and underlying code of the vehicle need to be greatly changed, to simultaneously report the vehicle status data and the vehicle trajectory data through the persistent connection. However, according to the vehicle data processing method provided in this application, only an upper-layer application needs to be simply improved, and the vehicle trajectory data may be reported to the server through a short connection, which optimizes a development process.

3. Multi-party reporting through the short connection may be implemented, a reporting party of short connection data is an upper-layer application, and the upper-layer application only needs to define a manner of reporting the vehicle status data through the short connection, so that relevant vehicle status data may be conveniently reported when a vehicle status changes. In addition, reporting of the vehicle status data by different reporting parties may also be performed, that is, each upper-layer application may report corresponding vehicle status data through the short connection.

4. A more accurate data source is provided for the server. Recommending information to the vehicle is a recommendation mode that highly depends on data, and therefore, completeness and accurately of data is critical to a recommendation result. According to the vehicle data processing method provided in this application, the vehicle status data and may be accurately associated the vehicle trajectory data well.

It is to be understood that steps in flowcharts of FIG. 2 to FIG. 4 and FIG. 6 to FIG. 8 are displayed in sequence based on indication of arrows, but the steps are not necessarily performed in sequence based on a sequence indicated by the arrows. Unless explicitly specified in this specification, execution of the steps is not strictly limited in the sequence, and the steps may be performed in other sequences. Moreover, at least some of the steps in FIG. 2 to FIG. 4 and FIG. 6 to FIG. 8 may include a plurality of steps or a plurality of stages. These steps or stages are not necessarily performed at the same time point, but may be performed at different time points. These steps or stages are not necessarily executed sequentially, but may be performed in turn or alternately with another step or at least some of steps or stages of the another step.

Figure 11:
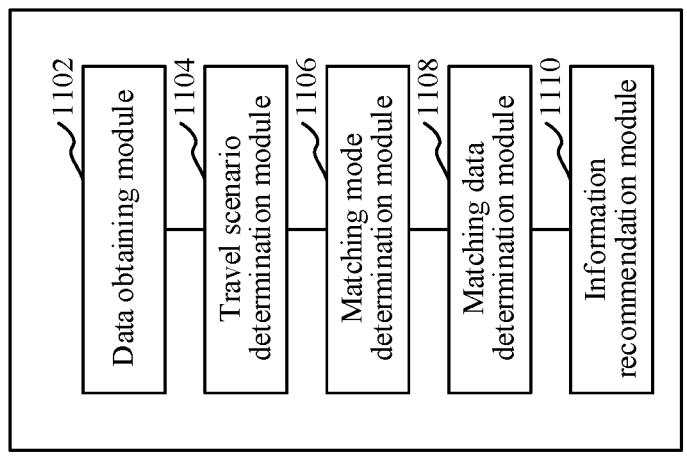
FIG. 11 is a structural block diagram of a vehicle data processing apparatus according to an embodiment.

In an embodiment, as shown in FIG. 11, a vehicle data processing apparatus is provided. The apparatus may use a software module, a hardware module, or a combination of a software module and a hardware module and become a part of a computer device. The apparatus specifically includes: a data obtaining module 1102, a travel scenario determination module 1104, a matching mode determination module 1106, a matching data determination module 1108, and an information recommendation module 1110.

The data obtaining module 1102 is configured to obtain current vehicle trajectory data and current vehicle status data of a target vehicle;

the travel scenario determination module 1104 is configured to obtain a historical vehicle trajectory data set of the target vehicle, and determine a current travel scenario and a corrected vehicle speed of the target vehicle according to the current vehicle trajectory data and the historical vehicle trajectory data set;

the matching mode determination module 1106 is configured to obtain vehicle speed reference information corresponding to the current travel scenario, and determine a target matching mode of the current vehicle trajectory data and the current vehicle status data based on the corrected vehicle speed and the vehicle speed reference information;

the matching data determination module 1108 is configured to obtain target matching vehicle trajectory data corresponding to the current vehicle status data from the current vehicle trajectory data according to the target matching mode; and the information recommendation module 1110 is configured to recommend information to the target vehicle based on the target matching vehicle trajectory data, the current vehicle status data, and the current travel scenario.

In an embodiment, the data obtaining module is further configured to select the current vehicle trajectory data from a candidate vehicle trajectory data set according to a data generation time when the current vehicle status data is received, the candidate vehicle trajectory data set being obtained in the following manners: receiving vehicle trajectory data periodically transmitted by the target vehicle, and adding the periodically transmitted vehicle trajectory data to the candidate vehicle trajectory data set, the periodically transmitted vehicle trajectory data carrying the data generation time.

In an embodiment, the data obtaining module is further configured to: obtain target data from the candidate vehicle trajectory data set in chronological order of the data generation time, and recommend information to the target vehicle based on the target data; and delete the target data from the candidate vehicle trajectory data set, to obtain an updated candidate vehicle trajectory data set.

In an embodiment, the travel scenario determination module is further configured to: perform trajectory matching between the current vehicle trajectory data and each piece of historical vehicle trajectory data in the historical vehicle trajectory data set, to obtain a plurality of matching degrees; use historical vehicle trajectory data corresponding to a maximum matching degree as target vehicle trajectory data, and use a target travel scenario corresponding to the target vehicle trajectory data as the current travel scenario; and perform vehicle speed correction on a current vehicle speed corresponding to the current vehicle trajectory data based on a historical vehicle speed corresponding to the target vehicle trajectory data, to obtain the corrected vehicle speed.

In an embodiment, the travel scenario determination module is further configured to obtain current road information; and perform vehicle speed correction on the current vehicle speed based on the current road information and the historical vehicle speed, to obtain the corrected vehicle speed.

In an embodiment, the matching mode determination module is further configured to determine that the target matching mode is a time information matching mode when the corrected vehicle speed is less than a first vehicle speed threshold in the vehicle speed reference information; and determine that the target matching mode is a position information matching mode when the corrected vehicle speed is greater than the first vehicle speed threshold and less than a second vehicle speed threshold in the vehicle speed reference information, the first vehicle speed threshold being less than the second vehicle speed threshold.

In an embodiment, the current vehicle trajectory data includes a plurality of pieces of current vehicle trajectory subdata, each piece of current vehicle trajectory subdata carries a data generation time, the current vehicle status data carries a data arrival time, and when the target matching mode is a time information matching mode, the matching data determination module is further configured to: calculate a corresponding time gap between the current vehicle status data and each current vehicle trajectory subdata according to the data generation time and the data arrival time; and use current vehicle trajectory subdata corresponding to a minimum time gap as the target matching vehicle trajectory data.

In an embodiment, the current vehicle trajectory data includes a plurality of pieces of current vehicle trajectory subdata, each piece of current vehicle trajectory subdata and the current vehicle status data both carry vehicle position information, and when the target matching mode is a position information matching mode, the matching data determination module is further configured to: calculate a corresponding vehicle position gap between the current vehicle status data and each current vehicle trajectory subdata according to the vehicle position information; and use current vehicle trajectory subdata corresponding to a minimum vehicle position gap as the target matching vehicle trajectory data.

In an embodiment, the information recommendation module is further configured to: obtain a recommended information type set matching the current travel scenario; determine a target recommended information type from the recommended information type set based on the current vehicle status data; generate target recommended information corresponding to the target recommended information type based on the target matching vehicle trajectory data and the current vehicle status data; and recommend the target recommended information to the target vehicle.

In an embodiment, the information recommendation module is further configured to: obtain an information configuration table corresponding to the recommended information type set, the information configuration table including a reference vehicle status data type corresponding to each recommended information type; and obtaining a reference vehicle status data type corresponding to the current vehicle status data from the information configuration table as a target vehicle status data type, and using a recommended information type corresponding to the target vehicle status data type as the target recommended information type.

In an embodiment, the information recommendation module is further configured to: determine a current position of the target vehicle according to the target matching vehicle trajectory data when the current vehicle status data meets an early warning condition corresponding to the target recommended information type; determine a target position of the target vehicle based on the current vehicle status data; and generate a target navigation path based on the current position and the target position, and generate the target recommended information according to the target navigation path.

In an embodiment, the information recommendation module is further configured to: obtain user information of a current driving user of the target vehicle; and generate the target recommended information based on the user information, the target matching vehicle trajectory data, and the current vehicle status data.

Figure 12:
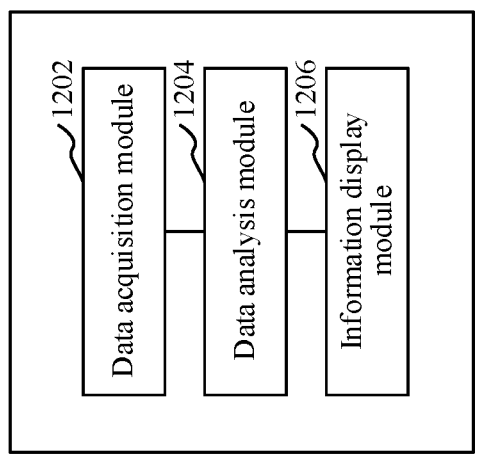
FIG. 12 is a structural block diagram of a vehicle data processing apparatus according to another embodiment.

In an embodiment, as shown in FIG. 12, a vehicle data processing apparatus is provided. The apparatus may use a software module, a hardware module, or a combination of a software module and a hardware module and become a part of a computer device. The apparatus specifically includes: a data acquisition module 1202, a data analysis module 1204, and an information display module 1206.

The data acquisition module 1202 is configured to acquire current vehicle trajectory data and current vehicle status data;

the data analysis module 1204 is configured to transmit the current vehicle trajectory data and the current vehicle status data to a server, so that the server obtains a historical vehicle trajectory data set, and determines a current travel scenario and a corrected vehicle speed of the vehicle according to the current vehicle trajectory data and the historical vehicle trajectory data set; obtains vehicle speed reference information corresponding to the current travel scenario, and determines a target matching mode of the current vehicle trajectory data and the current vehicle status data based on the corrected vehicle speed and the vehicle speed reference information; obtains target matching vehicle trajectory data corresponding to the current vehicle status data from the current vehicle trajectory data according to the target matching mode; and generates target recommended information based on the target matching vehicle trajectory data, the current vehicle status data, and the current travel scenario; and the information display module 1206 is configured to receive the target recommended information transmitted by the server, and display the target recommended information.

In an embodiment, the data analysis module is further configured to transmit the current vehicle trajectory data to the server through a persistent connection; and transmit the current vehicle status data to the server through a short connection.

According to the vehicle data processing apparatus, the current travel scenario of the vehicle is determined based on the current vehicle trajectory data and the historical vehicle trajectory data set of the target vehicle, and the current vehicle speed of the target vehicle may be corrected based on the current vehicle trajectory data and the historical vehicle trajectory data set of the target vehicle, to obtain a corrected vehicle speed that is more accurate and can better reflect an overall travel speed of the target vehicle in the current travel scenario. Further, the target matching mode of the current vehicle trajectory data and the current vehicle status data may be determined based on the current travel scenario and the corrected vehicle speed of the target vehicle, the current vehicle trajectory data and the current vehicle status data may be associated more accurately based on the target matching mode, and the target matching vehicle trajectory data matching the current vehicle status data may be determined more accurately, so that more accurate information recommendation may be performed on the target vehicle based on accurately matched current vehicle status data and target matching vehicle trajectory data, and the current travel scenario, thereby improving the accuracy and effectiveness of information recommendation.

For a specific limitation on the vehicle data processing apparatus reference may be made to the limitation on the vehicle data processing method described above. Details are not described herein again. The modules in the foregoing vehicle data processing apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a server, and an internal structure diagram thereof may be shown in FIG. 13. The computer device includes a processor, a memory, and a network interface that are connected by using a system bus. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for running of the operating system and the computer-readable instructions in the non-volatile storage medium. The database of the computer device is configured to store data such as a historical vehicle trajectory data set, vehicle trajectory data and vehicle status data, an information configuration table, and the like. The network interface of the computer device is configured to communicate with an external terminal through a network connection. The computer-readable instructions is executed by the processor to implement a vehicle data processing method.

In an embodiment, a computer device is provided. The computer device may be a terminal, and an internal structure diagram thereof may be shown in FIG. 14. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instructions in the non-volatile storage medium. The communication interface of the computer device is configured to communicate with an external terminal in a wired or wireless manner, and the wireless manner may be implemented by using Wi-Fi, an operator network, near field communication (NFC), or other technologies. The computer-readable instructions is executed by the processor to implement a vehicle data processing method. The display screen of the computer device may be a liquid crystal display screen or an electronic ink display screen. The input apparatus of the computer device may be a touch layer covering the display screen, or may be a key, a trackball, or a touch pad disposed on a housing of the computer device, and may further be an external keyboard, a touch pad, a mouse, or the like.

Figure 13:
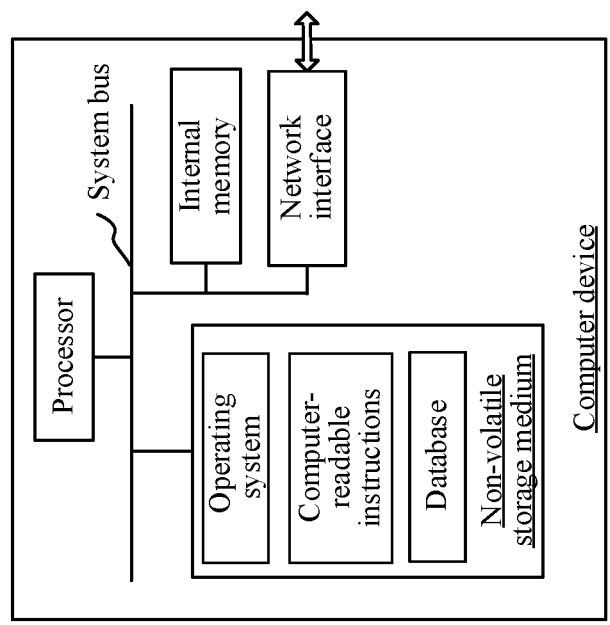
FIG. 13 is a diagram of an internal structure of a computer device according to an embodiment.
Figure 14:
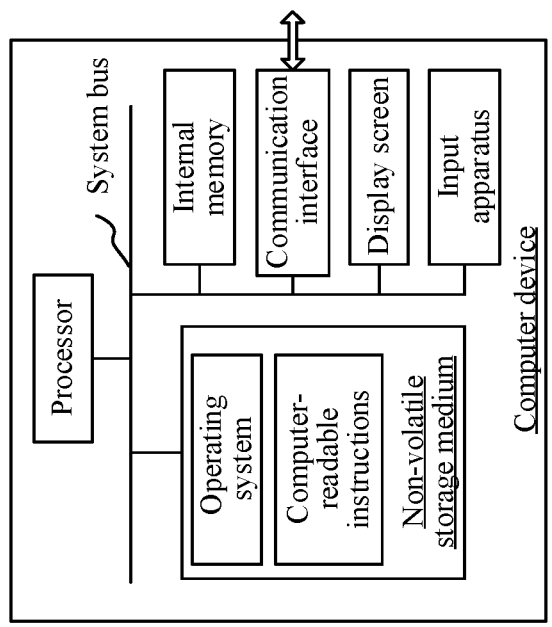
FIG. 14 is a diagram of an internal structure of a computer device according to another embodiment.

A person skilled in the art may understand that the structures shown in FIG. 13 and FIG. 14 are only block diagrams of a partial structure related to the solution of this application, and do not limit the computer device to which the solution of this application is applied. Specifically, the computer device may include more or fewer components than those shown in figures, or some components may be combined, or different component deployment may be used.

In an embodiment, a computer device is provided, including a memory and one or more processors, the memory storing computer-readable instructions, the one or more processors, when executing the computer-readable instructions, implementing the operations in the foregoing method embodiments.

In an embodiment, one or more non-volatile computer-readable storage media storing computer-readable instructions are provided, the computer-readable instructions, when executed by one or more processors, implementing the operations in the foregoing method embodiments.

In an embodiment, a computer program product or a computer program is provided. The computer program product or the computer program includes computer-readable instructions, and the computer-readable instructions are stored in a computer-readable storage medium. The processor of the computer device reads the computer-readable instructions from the computer-readable storage medium, and the processor executes the computer-readable instructions, to cause the computer device to perform the steps in the method embodiments.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of this application, which are described specifically and in detail, but cannot be construed as a limitation to the patent scope of the present disclosure. For a person of ordinary skill in the art, several transformations and improvements can be made without departing from the idea of this application. These transformations and improvements belong to the protection scope of this application. Therefore, the protection scope of the patent of this application shall be subject to the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A vehicle data processing method performed by a computer device, the method comprising:
    obtaining current vehicle trajectory data and current vehicle status data of a target vehicle;
    determining a current travel scenario and a corrected vehicle speed of the target vehicle according to the current vehicle trajectory data and a historical vehicle trajectory data set of the target vehicle;
    obtaining vehicle speed reference information corresponding to the current travel scenario, wherein the vehicle speed reference information includes at least one vehicle speed threshold;
    determining a target matching mode of the current vehicle trajectory data and the current vehicle status data based on the corrected vehicle speed and the at least one vehicle speed threshold in the vehicle speed reference information corresponding to the current travel scenario;
    obtaining target matching vehicle trajectory data corresponding to the current vehicle status data from the current vehicle trajectory data according to the target matching mode;
    generating recommended information for the target vehicle based on the target matching vehicle trajectory data, the current vehicle status data, and the current travel scenario; and
    transmitting the recommended information to the target vehicle to display on a terminal of the target vehicle.

2. The method according to claim 1, wherein the obtaining current vehicle trajectory data and current vehicle status data of a target vehicle comprises:
    selecting the current vehicle trajectory data from a candidate vehicle trajectory data set according to a data generation time when the current vehicle status data is received, the candidate vehicle trajectory data set being obtained in the following manners: receiving vehicle trajectory data periodically transmitted by the target vehicle, and adding the periodically transmitted vehicle trajectory data to the candidate vehicle trajectory data set, the periodically transmitted vehicle trajectory data carrying the data generation time.

3. The method according to claim 2, further comprising:
obtaining target data from the candidate vehicle trajectory data set in chronological order of the data generation time, and transmitting recommended information to the target vehicle based on the target data; and
deleting the target data from the candidate vehicle trajectory data set, to obtain an updated candidate vehicle trajectory data set.

4. The method according to claim 1, wherein the determining a current travel scenario and a corrected vehicle speed of the target vehicle according to the current vehicle trajectory data and a historical vehicle trajectory data set of the target vehicle comprises:
performing trajectory matching between the current vehicle trajectory data and each piece of historical vehicle trajectory data in the historical vehicle trajectory data set, to obtain a plurality of matching degrees;
using a piece of historical vehicle trajectory data of the historical vehicle trajectory data set corresponding to a maximum matching degree as target vehicle trajectory data, and using a target travel scenario corresponding to the target vehicle trajectory data as the current travel scenario; and
performing vehicle speed correction on a current vehicle speed corresponding to the current vehicle trajectory data based on a historical vehicle speed corresponding to the target vehicle trajectory data, to obtain the corrected vehicle speed.

5. The method according to claim 4, wherein the performing vehicle speed correction on a current vehicle speed corresponding to the current vehicle trajectory data based on a historical vehicle speed corresponding to the target vehicle trajectory data, to obtain the corrected vehicle speed comprises:
obtaining current road information; and
performing vehicle speed correction on the current vehicle speed based on the current road information and the historical vehicle speed, to obtain the corrected vehicle speed.

6. The method according to claim 1, wherein the determining a target matching mode of the current vehicle trajectory data and the current vehicle status data based on the corrected vehicle speed and the at least one vehicle speed threshold in the vehicle speed reference information corresponding to the current travel scenario comprises:
determining that the target matching mode is a time information matching mode when the corrected vehicle speed is less than a first vehicle speed threshold in the vehicle speed reference information; and
determining that the target matching mode is a position information matching mode when the corrected vehicle speed is greater than the first vehicle speed threshold and less than a second vehicle speed threshold in the vehicle speed reference information, the first vehicle speed threshold being less than the second vehicle speed threshold.

7. The method according to claim 1, wherein the current vehicle trajectory data comprises a plurality of pieces of current vehicle trajectory subdata, each piece of current vehicle trajectory subdata carrying a data generation time, the current vehicle status data carrying a data arrival time, and when the target matching mode is a time information matching mode, the obtaining target matching vehicle trajectory data corresponding to the current vehicle status data from the current vehicle trajectory data according to the target matching mode comprises:
calculating a corresponding time gap between the current vehicle status data and each piece of current vehicle trajectory subdata according to the corresponding data generation time and the data arrival time; and
using a piece of current vehicle trajectory subdata corresponding to a minimum time gap as the target matching vehicle trajectory data.

8. The method according to claim 1, wherein the current vehicle trajectory data comprises a plurality of pieces of current vehicle trajectory subdata, each piece of current vehicle trajectory subdata and the current vehicle status data both carrying vehicle position information, and when the target matching mode is a position information matching mode, the obtaining target matching vehicle trajectory data corresponding to the current vehicle status data from the current vehicle trajectory data according to the target matching mode comprises:
calculating a corresponding vehicle position gap between the current vehicle status data and each piece of current vehicle trajectory subdata according to the corresponding vehicle position information; and
using current vehicle trajectory subdata corresponding to a minimum vehicle position gap as the target matching vehicle trajectory data.

9. The method according to claim 1, wherein the transmitting recommended information to the target vehicle based on the target matching vehicle trajectory data, the current vehicle status data, and the current travel scenario comprises:
obtaining a recommended information type set matching the current travel scenario;
determining a target recommended information type from the recommended information type set based on the current vehicle status data;
generating target recommended information corresponding to the target recommended information type based on the target matching vehicle trajectory data and the current vehicle status data; and
transmitting the target recommended information to the target vehicle.

10. A computer device, comprising a memory and one or more processors, the memory storing computer-readable instructions, the computer-readable instructions, when executed by the one or more processors, causing the computer device to implement a vehicle data processing method including:
obtaining current vehicle trajectory data and current vehicle status data of a target vehicle;
determining a current travel scenario and a corrected vehicle speed of the target vehicle according to the current vehicle trajectory data and a historical vehicle trajectory data set of the target vehicle;
obtaining vehicle speed reference information corresponding to the current travel scenario, wherein the vehicle speed reference information includes at least one vehicle speed threshold;
determining a target matching mode of the current vehicle trajectory data and the current vehicle status data based on the corrected vehicle speed and the at least one vehicle speed threshold in the vehicle speed reference information corresponding to the current travel scenario;

obtaining target matching vehicle trajectory data corresponding to the current vehicle status data from the current vehicle trajectory data according to the target matching mode;
generating recommended information for the target vehicle based on the target matching vehicle trajectory data, the current vehicle status data, and the current travel scenario; and
transmitting the recommended information to the target vehicle to display on a terminal of the target vehicle.

11. The computer device according to claim 10, wherein the obtaining current vehicle trajectory data and current vehicle status data of a target vehicle comprises:
selecting the current vehicle trajectory data from a candidate vehicle trajectory data set according to a data generation time when the current vehicle status data is received, the candidate vehicle trajectory data set being obtained in the following manners: receiving vehicle trajectory data periodically transmitted by the target vehicle, and adding the periodically transmitted vehicle trajectory data to the candidate vehicle trajectory data set, the periodically transmitted vehicle trajectory data carrying the data generation time.

12. The computer device according to claim 11, wherein the method further comprises:
obtaining target data from the candidate vehicle trajectory data set in chronological order of the data generation time, and transmitting recommended information to the target vehicle based on the target data; and
deleting the target data from the candidate vehicle trajectory data set, to obtain an updated candidate vehicle trajectory data set.

13. The computer device according to claim 10, wherein the determining a current travel scenario and a corrected vehicle speed of the target vehicle according to the current vehicle trajectory data and a historical vehicle trajectory data set of the target vehicle comprises:
performing trajectory matching between the current vehicle trajectory data and each piece of historical vehicle trajectory data in the historical vehicle trajectory data set, to obtain a plurality of matching degrees;
using a piece of historical vehicle trajectory data of the historical vehicle trajectory data set corresponding to a maximum matching degree as target vehicle trajectory data, and using a target travel scenario corresponding to the target vehicle trajectory data as the current travel scenario; and
performing vehicle speed correction on a current vehicle speed corresponding to the current vehicle trajectory data based on a historical vehicle speed corresponding to the target vehicle trajectory data, to obtain the corrected vehicle speed.

14. The computer device according to claim 13, wherein the performing vehicle speed correction on a current vehicle speed corresponding to the current vehicle trajectory data based on a historical vehicle speed corresponding to the target vehicle trajectory data, to obtain the corrected vehicle speed comprises:
obtaining current road information; and
performing vehicle speed correction on the current vehicle speed based on the current road information and the historical vehicle speed, to obtain the corrected vehicle speed.

15. The computer device according to claim 10, wherein the determining a target matching mode of the current vehicle trajectory data and the current vehicle status data based on the corrected vehicle speed and the at least one vehicle speed threshold in the vehicle speed reference information corresponding to the current travel scenario comprises:
determining that the target matching mode is a time information matching mode when the corrected vehicle speed is less than a first vehicle speed threshold in the vehicle speed reference information; and
determining that the target matching mode is a position information matching mode when the corrected vehicle speed is greater than the first vehicle speed threshold and less than a second vehicle speed threshold in the vehicle speed reference information, the first vehicle speed threshold being less than the second vehicle speed threshold.

16. The computer device according to claim 10, wherein the current vehicle trajectory data comprises a plurality of pieces of current vehicle trajectory subdata, each piece of current vehicle trajectory subdata carrying a data generation time, the current vehicle status data carrying a data arrival time, and when the target matching mode is a time information matching mode, the obtaining target matching vehicle trajectory data corresponding to the current vehicle status data from the current vehicle trajectory data according to the target matching mode comprises:
calculating a corresponding time gap between the current vehicle status data and each piece of current vehicle trajectory subdata according to the corresponding data generation time and the data arrival time; and
using a piece of current vehicle trajectory subdata corresponding to a minimum time gap as the target matching vehicle trajectory data.

17. The computer device according to claim 10, wherein the current vehicle trajectory data comprises a plurality of pieces of current vehicle trajectory subdata, each piece of current vehicle trajectory subdata and the current vehicle status data both carrying vehicle position information, and when the target matching mode is a position information matching mode, the obtaining target matching vehicle trajectory data corresponding to the current vehicle status data from the current vehicle trajectory data according to the target matching mode comprises:
calculating a corresponding vehicle position gap between the current vehicle status data and each piece of current vehicle trajectory subdata according to the corresponding vehicle position information; and
using current vehicle trajectory subdata corresponding to a minimum vehicle position gap as the target matching vehicle trajectory data.

18. The computer device according to claim 10, wherein the transmitting recommended information to the target vehicle based on the target matching vehicle trajectory data, the current vehicle status data, and the current travel scenario comprises:
obtaining a recommended information type set matching the current travel scenario;
determining a target recommended information type from the recommended information type set based on the current vehicle status data;
generating target recommended information corresponding to the target recommended information type based on the target matching vehicle trajectory data and the current vehicle status data; and
transmitting the target recommended information to the target vehicle.

19. One or more non-transitory computer-readable storage media storing computer-readable instructions, the computer-readable instructions, when executed by one or more processors of a computer device, causing the computer device to implement a vehicle data processing method including:
- obtaining current vehicle trajectory data and current vehicle status data of a target vehicle;
- determining a current travel scenario and a corrected vehicle speed of the target vehicle according to the current vehicle trajectory data and a historical vehicle trajectory data set of the target vehicle;
- obtaining vehicle speed reference information corresponding to the current travel scenario, wherein the vehicle speed reference information includes at least one vehicle speed threshold;
- determining a target matching mode of the current vehicle trajectory data and the current vehicle status data based on the corrected vehicle speed and the at least one vehicle speed threshold in the vehicle speed reference information corresponding to the current travel scenario;
- obtaining target matching vehicle trajectory data corresponding to the current vehicle status data from the current vehicle trajectory data according to the target matching mode;
- generating recommended information for the target vehicle based on the target matching vehicle trajectory data, the current vehicle status data, and the current travel scenario; and
- transmitting the recommended information to the target vehicle to display on a terminal of the target vehicle.

20. The non-transitory computer-readable storage media according to claim 19, wherein the transmitting recommended information to the target vehicle based on the target matching vehicle trajectory data, the current vehicle status data, and the current travel scenario comprises:
- obtaining a recommended information type set matching the current travel scenario;
- determining a target recommended information type from the recommended information type set based on the current vehicle status data;
- generating target recommended information corresponding to the target recommended information type based on the target matching vehicle trajectory data and the current vehicle status data; and
- transmitting the target recommended information to the target vehicle.

* * * * *